(12) United States Patent
Horimai

(10) Patent No.: US 7,885,164 B2
(45) Date of Patent: Feb. 8, 2011

(54) OPTICAL INFORMATION RECORDING METHOD AND OPTICAL INFORMATION RECORDING MEDIUM

(75) Inventor: Hideyoshi Horimai, Yokohama (JP)

(73) Assignee: Optware Corporation, Kanagawa (JP)

( * ) Notice: Subject to any disclaimer, the term of this patent is extended or adjusted under 35 U.S.C. 154(b) by 1324 days.

(21) Appl. No.: 10/576,431

(22) PCT Filed: Oct. 21, 2004

(86) PCT No.: PCT/JP2004/015604

§ 371 (c)(1),
(2), (4) Date: Apr. 20, 2006

(87) PCT Pub. No.: WO2005/038789

PCT Pub. Date: Apr. 28, 2005

(65) Prior Publication Data

US 2007/0076562 A1   Apr. 5, 2007

(30) Foreign Application Priority Data

Oct. 21, 2003   (JP) .............................. 2003-360978
Feb. 4, 2004    (JP) .............................. 2004-027554

(51) Int. Cl.
G11B 7/00   (2006.01)
(52) U.S. Cl. ...................... 369/103; 369/128; 359/11; 359/12
(58) Field of Classification Search .................. None
See application file for complete search history.

(56) References Cited

U.S. PATENT DOCUMENTS

| | | | |
|---|---|---|---|
| 4,121,881 A | | 10/1978 | Bartolini et al. |
| 4,295,162 A | * | 10/1981 | Carlsen ....................... 386/128 |
| 5,416,616 A | * | 5/1995 | Jenkins et al. ................ 359/11 |
| 5,638,193 A | | 6/1997 | Trisnadi et al. |
| 6,414,762 B1 | | 7/2002 | Yamaji et al. |
| 7,248,556 B2 | * | 7/2007 | El Hafidi et al. ............. 369/103 |
| 2001/0035990 A1 | * | 11/2001 | Mok et al. ..................... 359/12 |
| 2002/0015376 A1 | | 2/2002 | Liu et al. |
| 2003/0025955 A1 | | 2/2003 | Curtis |
| 2003/0161246 A1 | | 8/2003 | Chuang |
| 2004/0175627 A1 | * | 9/2004 | Sutherland et al. ............. 430/1 |
| 2007/0076562 A1 | * | 4/2007 | Horimai ...................... 369/103 |

FOREIGN PATENT DOCUMENTS

EP   1 324 322   7/2003

(Continued)

*Primary Examiner*—Van N Chow
(74) *Attorney, Agent, or Firm*—DLA Piper LLP (US)

(57) ABSTRACT

Provided is an optical information recording method and an optical information recording medium, which can achieve easy duplication in holographic recording. The optical information recording method is for recording information to an optical information recording medium 4 which includes an information recording layer to which information is recorded using holography. In the method, virtual information light 6 composed of information light 2 to which information is added by spatially modulating at least a part of light ray flux emitted from a light source and of recording-specific reference light 3 is generated, and virtual information light 6 and virtual recording-specific reference light 8 are irradiated onto the information recording layer so that information is recorded thereto by interference pattern generated by interference between virtual information light 6 and virtual recording-specific reference light 8.

7 Claims, 12 Drawing Sheets

FOREIGN PATENT DOCUMENTS

| | | |
|---|---|---|
| JP | H10-124872 | 5/1998 |
| JP | 11-133845 | 5/1999 |
| JP | 11-311938 | 11/1999 |
| JP | 2002-244537 | 8/2002 |
| JP | 2003-99952 | 4/2003 |
| JP | 2004-93910 | 3/2004 |

* cited by examiner

OPTICAL INFORMATION RECORDING METHOD AND OPTICAL INFORMATION RECORDING MEDIUM

TECHNICAL FIELD

The present invention relates to an optical information recording method and an optical information recording medium, in which information light to which information is added by spatial modulation and recording-specific reference light are irradiated onto an optical recording medium to make them interfere with each other inside an information recording layer of the optical information recording medium, and information is recorded using the interference pattern generated thereby.

BACKGROUND ART

In holographic recording for recording information onto a recording medium using holography, in general, the information light carrying image information and recording-specific reference light are overlapped with each other inside the recording medium and the interference fringe pattern generated thereby is written onto the recording medium. For reproducing the recorded information, reproduction-specific reference light is irradiated to the recording medium for diffracting the interference pattern so as to reproduce the image information.

Recently, in the field of the holographic recording for achieving super high density optical recording, volume holography, especially digital volume holography, has been developed to be in practical use and has attracted attention. The volume holography is a method in which the interference patterns are written three-dimensionally by actively utilizing the thickness direction of the recording medium as well. The digital volume holography is a computer-oriented holographic recording method in which image information to be recorded is limited to binary digital patterns, while using the same recording medium and the recording system as that of the volume holography. In the digital volume holography, for example, picture information such as an analog picture is once digitized to be two-dimensional digital pattern and then it is recorded as image information. At the time of reproduction, the digital pattern information is read out and decoded to be displayed as the original picture information. Thereby, even when SN ratio (signal-to-noise ratio) at the time of reproduction is not so good, it becomes possible to reproduce the information which notably faithfully reflects the original information by carrying out differential analysis or carrying out error correction by coding the binary data.

In an example of recording information to a hologram recording layer by the volume holography, information light carrying information to be recorded and recording-specific reference light are simultaneously irradiated from a transparent substrate side for a prescribed length of time so as to generate interference fringe in the thickness direction in the hologram recording layer, and the interference fringe pattern is three-dimensionally fixed within the hologram recording layer for recording the information as the three-dimensional hologram (Japanese Unexamined Patent Publication No. 11-311938 and Japanese Unexamined Patent Publication No. 2003-99952).

Further, as the optical information recording method, there are a method in which information light and recording-specific reference light are disposed on optical axes at different angles, and a method in which both are coaxially disposed.

The recording method in which information light and recording-specific reference light are coaxially disposed has drawn attention as a method more suitable for the above-described volume holography (for example, see Japanese Unexamined Patent Publication No. 10-124872).

Japanese Unexamined Patent Publication No. 11-311938
Japanese Unexamined Patent Publication No. 2003-99952
Japanese Unexamined Patent Publication No. 10-124872
U.S. Pat. No. 5,638,193

DISCLOSURE OF THE INVENTION

Problems to be Resolved by the Invention

However, in the method in which information light and recording-specific reference light are coaxially disposed as disclosed in Japanese Unexamined Patent Publication No. 10-124872, it is extremely difficult to duplicate the recorded information from the optical recording medium to which the information is once recorded.

As for CDs and DVDs which are presently on the market, by producing a master as a master disc to which information to be recorded is formed as concavo-convex pits, and transcribing it by plastic injection molding using the master, it is possible to perform duplication by a single process. Thus, CDs and DVDs can be mass-produced and have prevailed all over the world.

On the other hand, holographic recording records interference fringes so that it cannot be molded by plastic injection molding or the like. Conventionally, when recording m sets of information (hologram) onto an optical information recording medium, image information carried by information light is changed m times and, each of the times, the information (hologram) needs to be recorded by irradiating the information light and the recording-specific reference light for making them overlap with each other within the optical information recording medium. Also, for duplicating optical recording medium to which the same information is recorded, it is necessary to again irradiate the information light and the recording-specific reference light m times. Therefore, the optical information recording medium to which information is recorded by holographic recording is not suitable for mass production.

Further, as a multiple recording method for performing volume holography, there are a shift multiple recording method in which a part of irradiation position is overlapped and shifted to the lateral direction, and an angular multiple recording method in which incident angle of information light or/and recording-specific reference light with respect to the recording medium is changed. However, each of the methods faces following problems.

In the conventional angular multiple recording method, a laser beam is irradiated a plurality of times in the same irradiation region by changing the angle of incident, so that the intensity of the laser beam has to be adjusted every time in accordance with the angle. For example, the degree of multiples is m and the number of the irradiation regions is n, it requires m×n times of adjustments on the intensity and the angle of incident. Moreover, when it requires time for stabilizing the interference pattern written onto the hologram recording layer of the recording medium, continuous irradiation cannot be performed, thereby extending the writing time. Furthermore, in the conventional angular multiple recording method, when writing information, a plurality of sets of information are recorded onto a single irradiation region after stopping the optical recording medium and, after completion of writing information onto the irradiation region, the optical recording medium is shifted or rotated. Thus, stopping and starting of the shift or rotation takes time, thereby causing deterioration of the transfer rate.

In the conventional shift multiple recording method, for example, the degree of multiples in the circumferential direction is m and the number of rows in the radial direction is n, the extent of overlap in the irradiation region for the first m times is different in the multiple recording in the circumferential direction. However, the extent of the overlap thereafter is substantially the same so that it is only necessary to adjust the intensity of the laser beam for the first m times. However, when shifted to a next row in the radial direction, it is necessary to adjust the intensity of the laser beam in the first m times once again so that, after all, it requires m×n times of adjustments on the intensity of the laser beam. Further, in the conventional shift multiple recording method, it is not possible to continuously write information onto a hologram recording layer which requires time for stabilizing the recording, thereby extending the writing time.

As another multiple recording method, U.S. Pat. No. 5,638,193 proposes a method in which a plurality of sets of information are recorded in the same region by changing the direction of the reference light through rotating the reference light with information light being the axis.

In the optical recording medium to which information is recorded using the multiple recording method, information to be recorded can be overlapped for being recorded so that recording density can be notably increased. However, the number of irradiations of the information light and the reference light increases accordingly and, as described above, intensities of the laser beams need to be adjusted. Thus, it takes time to manufacture and mass production has been extremely difficult.

The invention has been designed to overcome the foregoing problems. An object is to provide an optical information recording method and an optical information recording medium which can: in holographic recording in which information light and recording-specific reference light are coaxially disposed, very easily duplicate the recorded information from the optical recording medium; eliminate illegal duplication for achieving high security by having a key for duplication; achieve high-density and accurate recording; and record information continuously.

Moreover, another abject of the present invention is to provide an optical information recording method and an optical information recording medium, which achieve mass production of the optical recording medium to which information is recorded.

Means of Solving the Problems

In order to achieve the forgoing objects, the optical information recording method of the present invention is a method for recording information onto an optical information recording medium having an information recording layer to which information is recorded using holography, comprising the steps of: generating virtual information light composed of information light to which information is added by spatially modulating at least a part of light ray flux emitted from a light source and of recording-specific reference light; and irradiating virtual information light and virtual recording-specific reference light onto said information recording layer so that information is recorded to said information recording layer by interference pattern generated by interference between said virtual information light and said virtual recording-specific reference light.

Further, in the optical information recording method of the present invention, it is preferable that the interference pattern generated by interference between the virtual information light and the recording-specific reference light be recorded in a plurality of regions of the information recording layer so that the virtual recording-specific reference light comes under same condition.

Furthermore, in the optical information recording method of the present invention, it is preferable that a plurality of the regions do not overlap with each other.

Moreover, in the optical recording method of the present invention, the virtual information light and the recording-specific reference light may be irradiated, while rotating the optical information recording medium, onto a plurality of the regions by rotating the virtual recording-specific reference light with the virtual information light being the center at the same angular rate and in the same direction as that of the optical information recording medium.

By employing such a configuration, virtual information light is generated by using the recording method in which the information light and the virtual recording-specific reference light are coaxially disposed, and the interference pattern generated using the virtual information light and the virtual recording-specific reference light can be recorded in the information recording layer of the optical information recording medium. The optical information recording medium to which information is recorded as described can be used as a master for duplicating information of the virtual information light. For duplicating the information recorded in the optical information recording medium as the master, it is necessary to irradiate the virtual recording-specific reference light. Thus, the virtual recording-specific reference light serves as a key for maintaining the confidentiality of the virtual recording-specific reference light. Thereby, illegal duplication can be eliminated and high security can be achieved.

Further, by recording the interference pattern generated by the interference between the virtual information light and the virtual recording-specific reference light in a plurality of regions in such a manner that the virtual recording-specific reference light comes under same condition, it is possible to reproduce, at the time of reproduction, the virtual information light at once from a plurality of regions. Thereby, the productivity can be extremely improved. At this time, in the case where a plurality of the regions do not overlap with each other, it is possible to prevent mutual interference between the information light and recording-specific reference light of the virtual information light reproduced at once from a plurality of the regions. Thus, it is preferable.

Moreover, the optical information recording method of the present invention is a method for recording interference pattern generated between virtual information light and virtual recording-specific reference light in irradiation regions as information by irradiating the virtual information light composed of information light to which information is added by performing spatial modulation and of the recording-specific reference light, and the virtual recording-specific reference light onto an optical information recording medium having an information recording layer to which information is recorded using holography, comprising the steps of: recording a first information group by forming a plurality of first irradiation regions through irradiating the virtual information light and the virtual recording-specific reference light under a first condition onto a plurality of areas of the optical recording medium; and recording a second information group by forming a plurality of second irradiation regions through irradiating the virtual information light and the virtual recording-specific reference light under a second condition onto a plurality of areas of the optical recording medium by overlapping with the first irradiation regions.

Further, in the optical information recording method, it is preferable that a plurality of the first regions do not overlap with each other.

Furthermore in the optical information recording method of the present invention, it is preferable that an optical axis of the information light and an optical axis of the recording-specific reference light be on the same line.

Moreover, in the optical information recording method of the present invention, it is preferable that the virtual recording-specific reference light be parallel light.

By employing such a configuration, while having the above-described effects, the first information group under the first condition is recorded in a plurality of the first regions under the same state, and then the second information group under the second condition is recorded in the second irradiation regions which overlap with the first irradiation regions. Thus, for performing multiple recording for m number of times, the irradiation condition may be simply adjusted for m number of times. Moreover, time until completion of writing the first information group becomes the time for photochemical reaction in each of the first irradiation regions, so that multiple recording can be continuously performed. Thereby, it enables to obtain the optical information recording medium as a master in which information is recorded in super-high-dense manner. The multiple recording method as that of the present invention in which recording and reproduction are performed by surface unit under the same condition is named as a surface multiple recording method. This, however, can also be applied to the shift multiple recording method and angular multiple recording method.

Further, if a plurality of the first regions do not overlap with each other, it is possible to prevent mutual interference between the information light and the recording-specific reference light of the virtual information light reproduced at once from a plurality of the first regions. Thus, it is preferable.

Furthermore, if the optical axis of the information light and that of the recording-specific reference light are on the same line, a simple optical system can be used for reproducing the virtual information light and irradiating it onto another optical information recording medium. Thus, it is preferable.

Moreover, by using parallel light for the virtual recording-specific reference light, the virtual reproduction-specific reference light with the same wavefronts can be irradiated onto a plurality of regions so as to be interfered with the interference pattern in a plurality of regions for reproducing the recorded virtual information light. Thus, it is preferable.

Further, the optical information recording method of the present invention is a method for recording information recorded in a first optical information recording medium onto a second optical information recording medium, the information of the first optical recording medium being recorded by interference pattern generated between virtual information light and virtual recording-specific reference light in-irradiation regions by irradiating the virtual information light composed of information light to which information is added by performing spatial modulation and of the recording-specific reference light, and the virtual recording-specific reference light onto the first optical information recording medium having an information recording layer to which information is recorded using holography, comprising the steps of: irradiating virtual reproduction-specific reference light under same condition as that of the virtual recording-specific reference light onto the first optical recording medium; irradiating the virtual information light generated from the information recording layer by irradiation of the virtual reproduction-specific reference light onto the second optical information recording medium; and recording interference pattern generated between information light and recording-specific reference light of the virtual information light in an information recording layer of the second optical information recording medium.

Furthermore, in the optical information recording method of the present invention, it is preferable that the virtual reproduction-specific reference light be irradiated onto a plurality of the irradiation regions of the information recording layer of the first optical information recording medium and a plurality of sets of the virtual information light be reproduced from a plurality of the irradiation regions at once. Particularly, it is preferable that the virtual reproduction-specific reference light be irradiated onto the entire surface of the information recording layer of the first optical information recording medium.

Moreover, in the optical information recording method of the present invention, it is preferable that the virtual reproduction-specific reference light be phase-conjugate with the virtual recording-specific reference light or be irradiated onto the first optical information recording medium in the direction opposite from that of the virtual recording-specific reference light.

Further, in the optical information recording method of the present invention, it is preferable that the virtual information light generated from the information recording layer of the first optical information recording medium be irradiated onto the second optical information recording medium by changing magnification or be irradiated onto the second optical information recording medium with a first lens having a first focal length and a second lens having a second focal length being interposed therebetween.

Furthermore, in the optical information recording method of the present invention, it is preferable that the first optical information recording medium be larger than the second optical information recording medium.

By employing such a configuration, it is possible to reproduce the virtual information light in which the information light and the recording-specific reference light are coaxially disposed can be reproduced from the optical information recording medium as the master which is produced as described, and also to record the virtual information light in an another optical information recording medium. Thus, it enables to easily duplicate the optical information recording medium in which information is recorded by using the recording method where the information light and the recording-specific reference light are coaxially disposed. At the time of duplication, it is necessary to irradiate the virtual recording-specific reference light used at the time of recording. Thus, the virtual recording-specific reference light serves as a key for maintaining the confidentiality of the virtual recording-specific reference light. Thereby, illegal duplication can be eliminated and high security can be achieved. Moreover, by using the duplicated optical information recording medium, the recorded information can be easily and surely reproduced through irradiating the same reproduction-specific reference light as the recording-specific reference light used as a part of virtual information light.

Further, by reproducing a plurality of sets of virtual information light at once from a plurality of the regions through irradiating the virtual reproduction-specific reference light onto a plurality of the irradiation regions of the information recording layer of the first optical information recording medium, time for duplication can be notably shortened and the productivity can be remarkably improved. Particularly, the productivity can be more improved by performing irradiation over the entire surface of the information recording layer of the first optical information recording medium.

Furthermore, if the virtual reproduction-specific reference light that is phase-conjugate with the virtual recording-specific reference light is irradiated onto the first optical information recording medium, the reproduced virtual information light is reproduced through the route reversed from the time of recording. Thus, aberrations due to dents on the surface of the optical system and the optical information recording medium formed at the time of recording, difference in the film thickness of the information recording layer, etc. can be compensated, so that the aberrations can be further reduced. Thus, it is preferable. Irradiation of the virtual reproduction-specific reference light in the direction exactly opposite from the irradiating direction of the virtual recording-specific reference light provides phase conjugation.

Moreover, by irradiating the virtual information light generated from the information recording layer of the first optical information recording medium onto the second optical information recording medium by changing the magnification, it is possible to change the wavelengths of the light sources of the virtual information light, virtual information recording-specific reference light and the virtual reproduction-specific reference light which are to be irradiated onto the information recording layer of the first information recording medium, and the wavelength of the light source of the reproduction-specific reference light for reproducing the information light recorded in the second optical information recording medium. Further, by irradiating the virtual information light generated from the information recording layer of the first optical information recording medium onto the second optical information recording medium with the first lens having the first focal length and the second lens having the second focal length being interposed therebetween, it is also possible to change the wavelengths of the light sources of the virtual information light, virtual information recording-specific reference light and the virtual reproduction-specific reference light which are to be irradiated onto the information recording layer of the first information recording medium, and the wavelength of the light source of the reproduction-specific reference light for reproducing the information light recorded in the second optical information recording medium.

Furthermore, more minute interference patterns can be precisely recorded by making the first optical information recording medium larger than the second optical information recording medium.

Further, the optical information recording method of the present invention is a method for recording information recorded in a first optical information recording medium onto a second optical information recording medium, the information of the first optical recording medium being recorded by interference pattern generated between virtual information light and first virtual recording-specific reference light in irradiation regions by irradiating the virtual information light composed of information light to which information is added by performing spatial modulation and of the recording-specific reference light, and the first virtual recording-specific reference light onto the first optical information recording medium having an information recording layer to which information is recorded using holography, comprising the steps of: irradiating virtual reproduction-specific reference light under same condition as that of the first virtual recording-specific reference light onto the first optical information recording medium; irradiating said virtual information light generated from the information recording layer by irradiation of the virtual reproduction-specific reference light onto the second optical information recording medium; irradiating second virtual recording-specific reference light onto the second optical information recording medium; and recording interference pattern between said virtual information light and the second recording-specific reference light in the information recording layer of the second optical information recording medium.

Further, in the optical information recording method of the present invention, it is preferable that the virtual reproduction-specific reference light be irradiated onto a plurality of the irradiation regions of the information recording layer of the first optical information recording medium and a plurality of sets of the virtual information light be reproduced from a plurality of the irradiations regions at once. Particularly, it is preferable that the virtual reproduction-specific reference light be irradiated onto the entire surface of the information recording layer of the first optical information recording medium.

Furthermore, in the optical information recording method of the present invention, it is preferable that the second virtual recording-specific reference light be irradiated onto a plurality of irradiation regions to which a plurality of sets of the virtual information light be irradiated. Particularly, it is preferable that the virtual reproduction-specific reference light be irradiated onto the entire surface of the information recording layer of the second optical information recording medium.

Moreover, in the optical information recording method of the present invention, it is preferable that the virtual reproduction-specific reference light be phase-conjugate with the first virtual recording-specific reference light or be irradiated onto the first optical information recording medium in the direction opposite from that of the first virtual recording-specific reference light.

Further, in the optical information recording method of the present invention, it is preferable that the virtual information light generated from the information recording layer of the first optical information recording medium be irradiated onto the second optical information recording medium by changing the magnification or the virtual information light generated from the information recording layer of the first optical information recording medium be irradiated onto the second optical information recording medium with a first lens having a first focal length and a second lens having a second focal length being interposed therebetween.

Furthermore, in the optical information recording method of the present invention, it is preferable that the second virtual recording-specific reference light be modulated spatially.

By employing such a configuration, it is possible to reproduce the virtual information light from the optical information recording medium as the master which is produced as described, and to record the interference pattern generated by irradiating the virtual information light and the second virtual reproduction-specific reference light onto the second optical information recording medium. Thereby, the optical information recording medium as a mother can be easily duplicated. At the time of duplication, it is necessary to irradiate the first virtual recording-specific reference light used at the time of recording. Thus, the virtual recording-specific reference light serves as a key for maintaining the confidentiality of the first virtual recording-specific reference light. Thereby, illegal duplication can be eliminated and high security can be achieved. Moreover, as for the duplicated optical information recording medium as the mother, the second virtual recording-specific reference light also serves as a key for duplication for maintaining the confidentiality of the second virtual recording-specific reference light. Thereby, illegal duplication can be eliminated and high security can be achieved. It is therefore easy to produce the mother so that slaves can be easily mass-produced.

Further, by reproducing a plurality of sets of virtual information light at once from a plurality of the regions through irradiating the first virtual reproduction-specific reference light onto a plurality of the irradiation regions of the information recording layer of the first optical information recording medium, time for duplication can be notably shortened and the productivity can be remarkably improved. Particularly, the productivity can be more improved by performing irradiation over the entire surface of the information recording layer of the first optical information recording medium.

Furthermore, in the information recording layer of the second optical information recording medium, by irradiating the second virtual reproduction-specific reference light in a plurality of the irradiation regions where a plurality of sets of the virtual information light are irradiated, information can be recorded at once. Thus, time for duplication can be notably shortened and the productivity can be remarkably improved. Particularly, the productivity can be more improved by performing irradiation over the entire surface of the information recording layer of the second optical information recording medium.

Moreover, if the virtual reproduction-specific reference light that is phase-conjugate with the virtual recording-specific reference light is irradiated onto the first optical information recording medium, the reproduced virtual information light is reproduced through the route reversed from the time of recording. Thus, aberrations due to dents on the surface of the optical system and the optical information recording medium formed at the time of recording, difference in the film thickness of the information recording layer, etc. can be compensated, so that the aberrations can be further reduced. Thus, it is preferable. Irradiation of the virtual reproduction-specific reference light in the direction exactly opposite from the irradiating direction of the virtual recording-specific reference light provides phase conjugation.

Further, by irradiating the virtual information light generated from the information recording layer of the first optical information recording medium onto the second optical information recording medium by changing the magnification, it is possible to change the wavelengths of the light sources of the virtual information light, virtual information recording-specific reference light and the virtual reproduction-specific reference light which are to be irradiated onto the information recording layer of the first information recording medium, and the wavelength of the light source of the reproduction-specific reference light for reproducing the information light recorded in the second optical information recording medium. By irradiating the virtual information light generated from the information recording layer of the first optical information recording medium onto the second optical information recording medium with the first lens having the first focal length and the second lens having the second focal length being interposed therebetween, it is also possible to change the wavelengths of the light sources of the virtual information light, virtual information recording-specific reference light and the virtual reproduction-specific reference light which are to be irradiated onto the information recording layer of the first information recording medium, and the wavelength of the light source of the reproduction-specific reference light for reproducing the information light recorded in the second optical information recording medium.

Further, spatial modulation of the second virtual recording-specific reference light enables elimination of illegal duplication, thereby providing high security, since it is not possible to make duplications from the second optical information recording medium without knowing the spatial modulation pattern.

The optical information recording medium of the present invention comprises an information recording layer for recording information by interference pattern generated between virtual information light composed of information light and of recording-specific reference light, and virtual recording-specific reference light using holography, and for generating the virtual information light recorded when the virtual recording-specific reference light is irradiated.

Further, in the optical information recording medium of the present invention, it is preferable that the interference pattern generated between the virtual information light and the recording-specific reference light be recorded in a plurality of regions of the information recording layer, and the virtual information light be generated from a plurality of the regions when the same virtual reproduction-specific reference light is irradiated onto a plurality of the regions.

By employing such a configuration, the optical information recording medium achieved by the present invention can be used as a master. For reproducing the information recorded in the optical information recording medium as the master, it is necessary to irradiate the virtual recording-specific reference light. Thus, the virtual recording-specific reference light serves as a key for maintaining the confidentiality of the virtual recording-specific reference light. Thereby, illegal duplication can be eliminated and high security can be achieved.

Further, when the interference pattern generated by the interference between the virtual information light and the virtual recording-specific reference light is recorded in a plurality of regions of the information recording layer, and the same virtual reproduction-specific reference light is irradiated onto a plurality of the regions, it is possible to generate the virtual information light form a plurality of the regions. Thus, it enables to duplicate a plurality of sets of information at once, thereby improving the productivity.

EFFECT OF THE INVENTION

The optical information recording method and the optical information recording medium of the present invention have configurations and effects as described above. Thus, in holographic recording in which the information light and the recording-specific reference light are coaxially disposed, it is possible to easily perform duplication of the recorded information from the optical information recording medium to which the information has once been recorded. Moreover, there is provided a key for duplication so that illegal duplication can be eliminated and high security can be achieved. Further, it enables to achieve high density and accurate recording and also to record information continuously.

BRIEF DESCRIPTION OF THE DRAWINGS

FIG. 1 show an embodiment of an optical information recording method and an optical information recording medium of the present invention, while FIG. 1A is a plan view of a spatial modulator and FIG. 1B is a front elevational view of recording section;

BEST MODE FOR CARRYING OUT THE INVENTION

Embodiments of the present invention will be described hereinafter by referring to FIG. 1 to FIG. 13.

Figure 1:
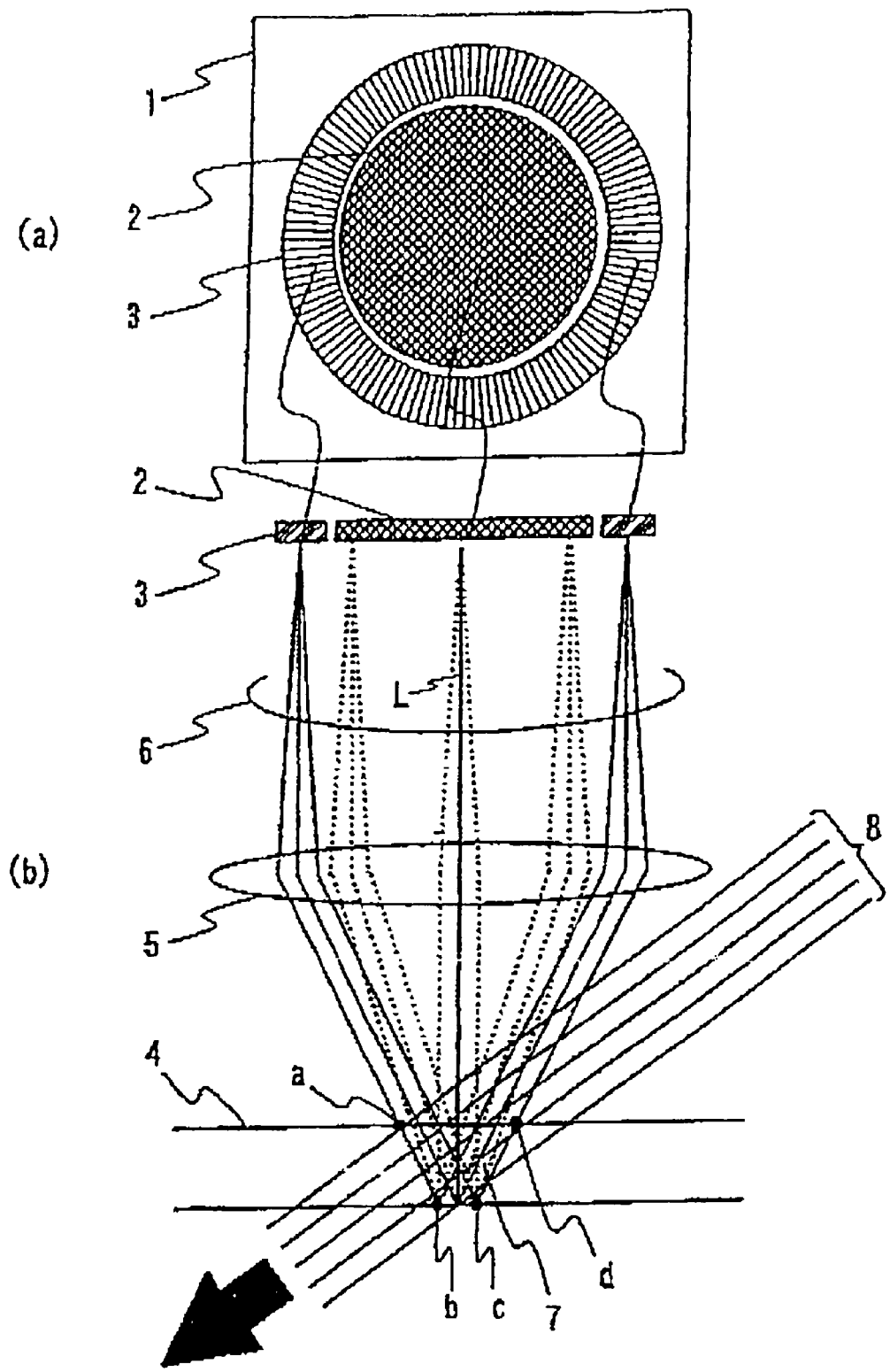

FIG. 1 shows an embodiment of the optical information recording method and the optical information recording medium according to the present invention.

The embodiment uses a recording method in which information light and recording-specific reference light are coaxially disposed. As shown in FIGS. 1A and 1B, in the embodiment, at least a part of light ray flux emitted from a light source (not shown) by a known method is divided into information light 2 to which information is added through performing spatial modulation by a spatial modulator 1 and recording-specific reference light 3. In the embodiment, the information light 2 and the recording-specific reference light 3 are coaxially disposed with respect to an optical axis L with the information light being in the center and the recording-specific reference light being in the outer periphery portion. An objective lens 5 is disposed between the spatial modulator 1 and a known optical information recording medium 4 with light transmittance having an information recording layer to which information is recorded using holography. The information light 2 and the recording-specific reference light 3 passing through the portion of the spatial modulator 1 proceed together as virtual information light 6 and irradiated to a prescribed irradiation region 7 (portion surrounded by four points a, b, c and d) of an information recording layer of the optical information recording medium 4 through the objective lens 5. Virtual recording-specific reference light 8 is irradiated to the irradiation region 7 at a slant angle with respect to the optical axis L. Thereby, in the irradiation region 7 of the information recording layer of the optical information recording medium 4, information is recorded by interference patterns obtained by interference between the virtual information light 6 and the virtual recording-specific reference light 8.

In FIG. 1, the information light 2 and the recording-specific light 3 of the virtual information light 6 are modulated by a single spatial modulator 1 and the optical axes of the information light 2 and the recording-specific reference light 3 are disposed on the same line. However, the configuration is not limited to this. The virtual information light 6 may once be divided into the information light 2 and the recording-specific reference light 3, and each light may be modulated using a separate spatial modulator, respectively. Then, the information light 2 and the recording-specific reference light 3 may be synthesized so that the optical axes of the information light 2 and the recording-specific reference light 3 are disposed on the same line.

As described, the optical axes of the information light 2 and the recording-specific reference light 3 of the virtual information light 6 are disposed on the same line, so that the optical system can be simplified when duplicating information onto another optical information recording medium by reproducing the virtual information light 6, which will be described later.

Further, it is preferable to use parallel light as the virtual recording-specific reference light 8, as shown in FIG. 1, so that virtual reproduction-specific reference light can be collectively irradiated onto a plurality of irradiation regions 7 at the time of reproduction as will be described later. However, a lens may be used for collecting light onto the information recording layer as the virtual recording-specific reference light 8.

The optical information recording medium 4 having interference patterns recorded in the information recording layer as described using the virtual information light 6 and the virtual recording-specific reference light 8 can be used as a master for duplication afterwards. In order to duplicate the information recorded in the optical information recording medium 4 as the master, it is necessary to irradiate the same virtual reproduction-reference light as the virtual recording-specific reference light 8. Thus, the virtual recording-specific reference light 8 serves as a key for duplication, thereby keeping the confidentiality of the property of the virtual recording-specific reference light 8. Thus, illegal duplication can be eliminated and high security can be achieved.

As the methods of using the optical information recording medium 4, first, there is a method in which the interference pattern itself obtained by the interference between the virtual information light 6 and the virtual recording-specific reference light 8 is recorded onto another optical information recording medium for duplicating completely the same information as in the optical information recording medium 4, or the interference pattern obtained by the interference between the virtual information light 6 and another virtual recording-specific reference light 8 is recorded onto another optical information recording medium to be used as a mother. Secondly, there is a method for duplicating information carried by the information light 2 of the virtual information light 6, in which the interference pattern obtained by the interference between the information light 2 and the recording-specific reference light 3 is recorded onto another optical information recording medium to be used as a slave.

Here, the master means a master disc which becomes the base for duplication afterwards and is produced by irradiating the virtual information light 6 and the virtual recording-specific reference light 8. The mother, to which completely the same virtual information light as in the master is recorded, is produced using the master or another mother as the base, when it becomes necessary to duplicate the virtual information light for producing the slave for the purpose of mass production or the like. Since completely the same virtual information light as in the master is recorded in the mother, it is possible to produce another mother or slave. The mothers include the ones to which completely the same information as that of the master (the interference pattern by the same virtual information light and virtual recording-specific reference light) is recorded. In the slave, the interference pattern obtained by the interference between the information light 2 of the virtual information light and the recording-specific reference light 3 is recorded. Thus, it is possible to read out the information carried by the information light 2 by reproducing the slave using the reproduction-specific reference light (light of the same condition as that of the recording-specific reference light 3).

In order to use the optical information recording medium 4 as the master, it is preferable to record the interference pattern obtained by the interference between the virtual information light and the virtual recording-specific reference light onto a plurality of the irradiation regions 7 of the information recording layer in such a manner that the virtual recording-specific reference light 8 comes under the same condition. In this case, by collectively irradiating the same virtual reproduction-specific reference light as the virtual recording-specific reference light 8 onto a plurality of the irradiation regions 7 of the optical information recording medium 4, the virtual information light 6 can be reproduced at once from a plurality of the irradiation regions 7 of the optical information recording medium 4 and it can be recorded to another optical information recording medium at once. Particularly, it is preferable to irradiate the virtual reproduction-specific reference light over the entire surface of the optical information recording medium 4 collectively, so that recording can be performed at once on the entire surface of another optical information recording medium.

Further, it is preferable that a plurality of the irradiation regions be not overlapped with each other, since, under the state where a plurality of the irradiation regions 7 overlap with each other, interference may be generated between each virtual information light 6 reproduced from a plurality of the irradiation regions 7 when reproduction is performed using the same virtual recording-specific reference light 8. Specifically, the information light 2 and the recording-specific reference light 3 of a first virtual information light 6 reproduced from a first irradiation region 7a interfere with the information light 2 and the recording-specific reference light 3 of a second virtual information light 6 reproduced from a second irradiation region 7b. Thus, the interference between information light 2 and the recording-specific reference light 3 of the first virtual information light 6 cannot be recorded accurately.

As described, for performing reproduction by using the same virtual reproduction-specific reference light, it may be interfered with the virtual information light 6 in a plurality of regions 7 by setting the wavelength, direction, extent of tilt and phase of the virtual recording-specific reference light 8 to be under the same condition.

As one of the methods, there is one in which the optical information recording medium 4 is mounted on an X-Y stage, and the optical information recording medium 4 is carried by controlling the X-Y stage so that a desired interference pattern can be recorded in each irradiation region 7. Further, there is another method in which the optical information recording medium 4 is fixed, and the virtual information light 6 and the virtual recording-specific reference light 8 are moved in the X-Y direction. Moreover, there is a method in which the optical information recording medium 4 is fixed and, while irradiating the virtual recording-specific reference light 8 over the whole surface, the virtual information light 6 is moved in the X-Y direction.

Further, in the case where a disc type medium is used as the optical information recording medium 4, it is possible to perform recording while rotating the optical information recording medium 4. When information is recorded while rotating the optical information recording medium 4, it becomes easy to record each set of information along the track. In this case, when setting the wavelength, direction, tilt and phase of the virtual recording-specific reference light 8 to be under the same condition, the direction of the virtual recording-specific reference light 8 is changed due to the rotation of the optical information recording medium 4, thereby causing a problem.

Figure 8:
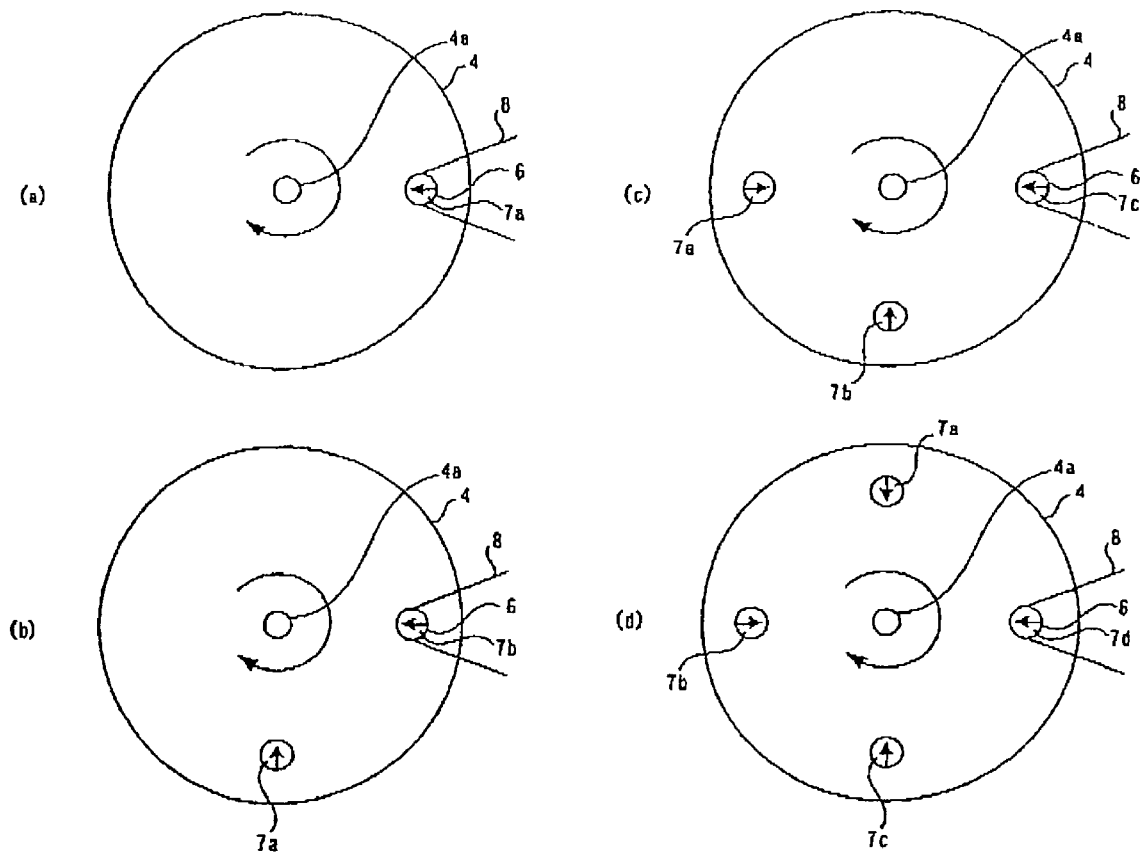
FIGS. 8A to 8D are illustrations for describing the directions of virtual recording-specific reference light in the rotating optical information recording medium.
Figure 9:
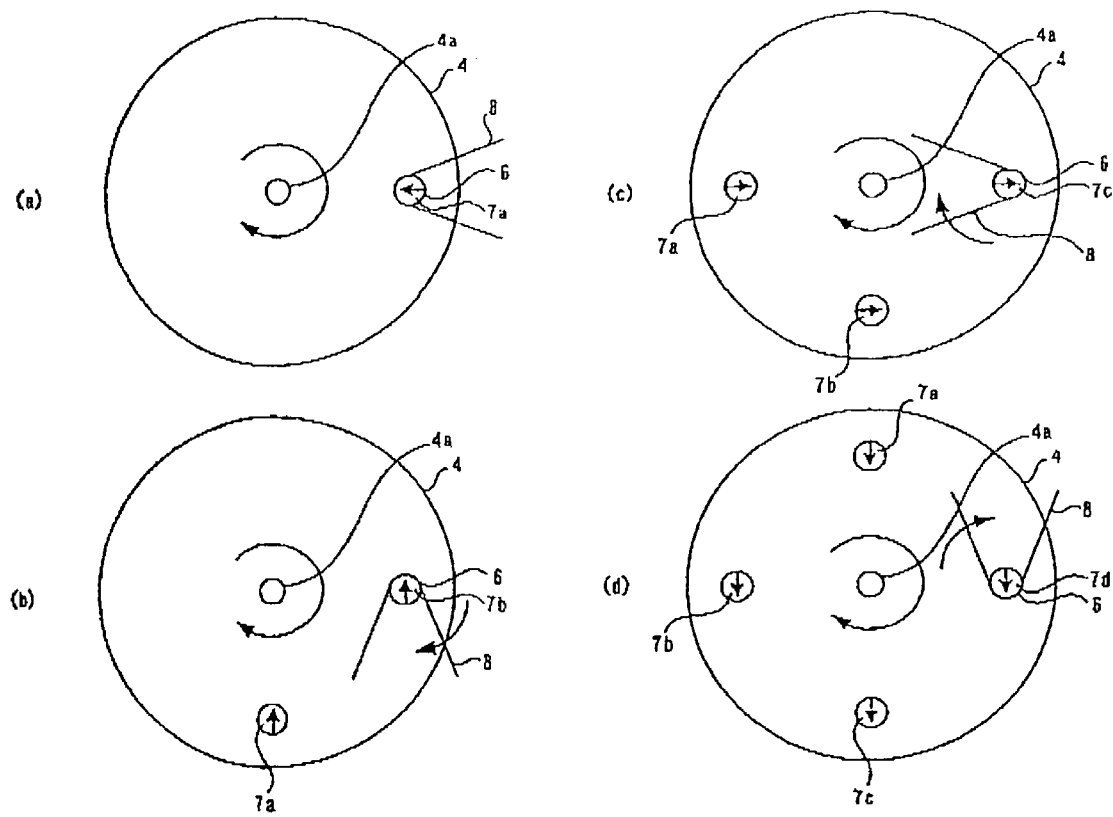
FIGS. 9A to 9D are illustrations for describing the directions of virtual recording-specific reference light in the rotating optical information recording medium.

Description will be provided in this respect by referring to FIG. 8 and FIG. 9. FIG. 8 and FIG. 9 are plan views of the optical information recording medium 4, and the optical information recording medium 4 rotates with a center 4a being the axis. In FIG. 8 and FIG. 9, the direction of the virtual recording-specific reference light 8 at the time of recording is shown by an arrow in the irradiation region of the virtual information light 6. First, as shown in FIG. 8A, the virtual recording-specific reference light 8 is irradiated onto the first irradiation region 7a from the right side for recording the interference fringe. Then, as shown in FIG. 8B, the optical information recording medium 4 is rotated clockwise by 90° so as to irradiate the virtual recording-specific reference light 8 onto the second irradiation region 7b from the right side for recording the interference fringe. Further, as shown in FIG. 8C, the optical information recording medium 4 is rotated clockwise by 90° so as to irradiate the virtual recording-specific reference light 8 onto the third irradiation region 7c from the right side for recording the interference fringe. Finally, as shown in FIG. 8D, the optical information recording medium 4 is rotated clockwise by 90° so as to irradiate the virtual recording-specific reference light 8 onto the fourth irradiation region 7d from the right side for recording the interference fringe.

As can be seen from FIG. 8D, the first to fourth irradiation regions 7a to 7d are irradiated in the irradiation position from the right side. However, due to the rotation of the optical information recording medium 4, directions of the virtual recording-specific reference light 8 become point symmetrical with respect to the center 4a. Thus, even though the same virtual reproduction-specific reference light is irradiated from the right side, only one out of the first to fourth irradiation regions 7a to 7d is reproduced, so that it is impossible to reproduce the virtual information light 6 from a plurality of the irradiation regions 7 at once.

Therefore, for forming a plurality of the irradiation regions 7a to 7d, the direction of the virtual recording-specific reference light 8 may be rotated in the same rotation direction as that of the optical information recording medium 4 with the virtual information light 6 being the center at the same angular velocity as that of the optical information recording medium 4. Description will be provided by referring to FIG.

9. FIG. 9 is a plane view, so that the virtual information light 6 is irradiated onto each of the irradiation regions 7a to 7d vertically with respect to the paper face.

First, as shown in FIG. 9A, the virtual recording-specific reference light 8 is irradiated onto the first irradiation region 7a from the right side for recording the interference fringe. Then, as shown in FIG. 9A, the optical information recording medium 4 is rotated clockwise by 90° so as to irradiate the virtual recording-specific reference light 8 onto the second irradiation region 7b for recording the interference fringe. At this time, the direction of the virtual recording-specific reference light 8 is also rotated clockwise by 90° with the virtual information light 6 being the center to irradiate the virtual recording-specific reference light 8. That is, in the second irradiation region 7b, the virtual recording-specific reference light 8 is irradiated from the bottom side of FIG. 9B. Further, as shown in FIG. 9C, the virtual recording-specific reference light 8 in which the direction is rotated clockwise by 90° with the center being the virtual information light 6 is irradiated onto the third irradiation region 7c for recording the interference fringe. Finally, as shown in FIG. 9D, the virtual recording-specific reference light 8 in which the direction is rotated clockwise by 90° with the center being the virtual information light 6 is irradiated onto the fourth irradiation region 7d for recording the interference fringe.

As can be seen from FIG. 9D, in all of the first to fourth irradiation regions 7a to 7d, the virtual recording-specific reference light 8 is irradiated from the upper side and the directions of the virtual recording-specific reference light 8 are the same. Thus, by irradiating the same virtual reproduction-specific reference light from the upper side, it is possible to reproduce the virtual information light 6 from the first to fourth irradiation regions 7a to 7d at once.

For rotating the direction of the virtual recording-specific reference light 8 with the virtual information light 6 being the center, the optical system of the virtual recording-specific reference light 8 may be rotated. For example, it may be achieved by applying a device disclosed in U.S. Pat. No. 5,638,193 described above. In U.S. Pat. No. 5,638,193, multiple recording on the same area is performed by changing the direction of the reference light. However, the present invention is distinctive in respect that the direction of the reference light is changed to be irradiated onto a plurality of irradiation regions which do not overlap with each other.

In the case where the interference between the virtual information light 6 and the virtual recording-specific reference light 8 is recorded without rotating the optical information recording medium 4 by using the above-described X-Y stage, when rotating the mother or the slave for duplication by rotating the optical information recording medium 4 or using the optical information recording medium 4 as the master at the time of reproduction, it is necessary to perform recording by giving consideration to an affect of the rotation at the time of reproduction. As an method for this, by performing recording with the direction of the virtual recording-specific reference light 8 being set as shown in FIG. 9D, the virtual information light 6 can be reproduced from each of the irradiation regions 7a to 7d through irradiating the virtual reproduction-specific reference light from the right side at the time of reproduction. Further, in the case where the slave is duplicated from the optical information recording medium 4 using a duplication method to be described later, by irradiating the reproduction-specific reference light onto the interference pattern between the information light 2 and the recording-specific reference light 3 recorded in the slave while rotating the slave for reproducing the information light 2, an image with the rotated information light 2 is reproduced. Therefore, when recording the optical information recording medium 4 as the master, the image information carried by the information light 2 needs to be rotated. For rotating the image information, the two-dimensional digital pattern information which is displayed in the spatial modulator 1 may be rotated or an optical element for rotating the image information may be added to the optical system of the information light.

FIG. 2 to FIG. 5 show a multiple recording method for recording information to the optical information recording medium.

Figure 2:
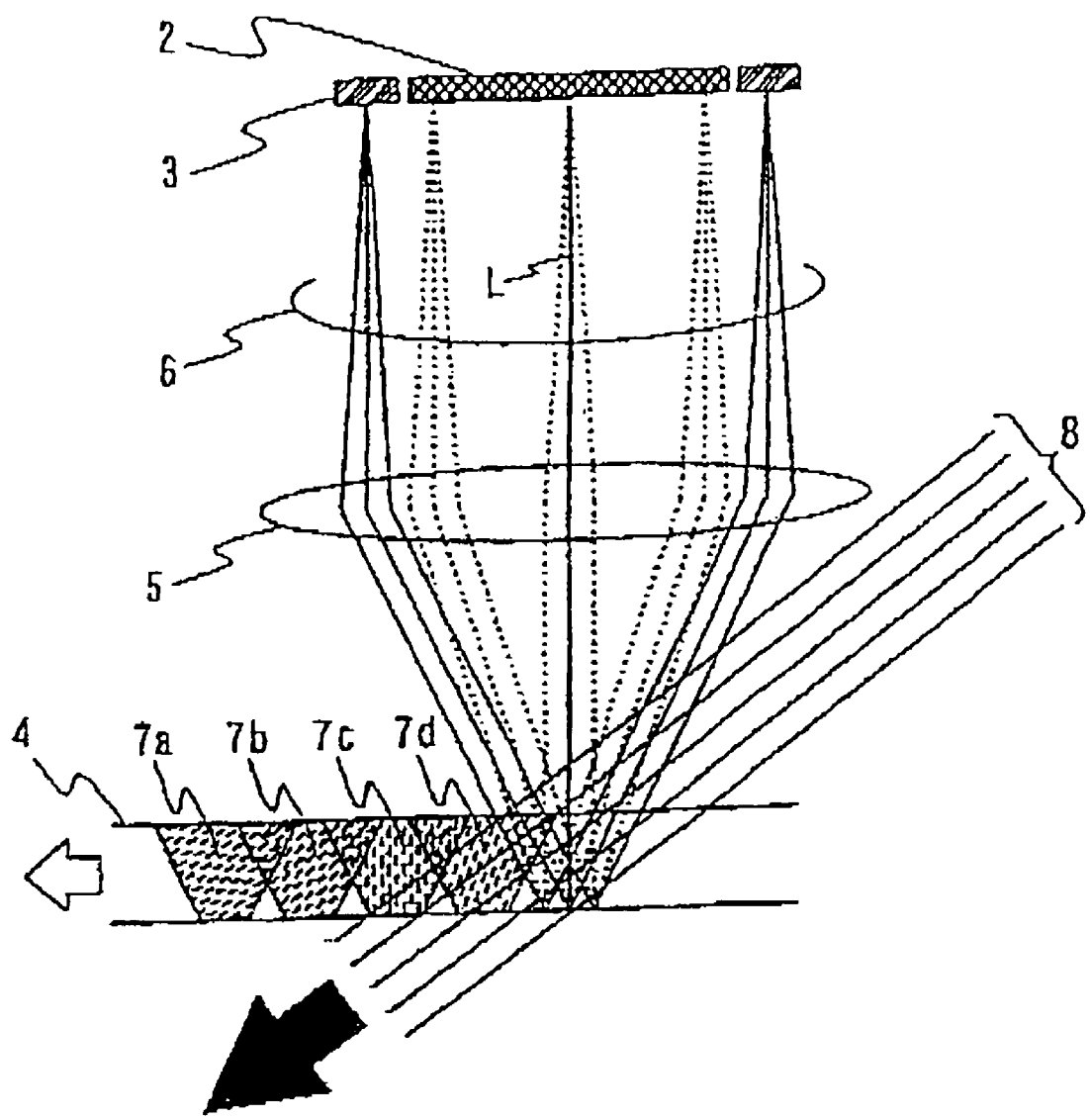
FIG. 2 is a front elevational view similar to FIG. 1B showing a multiple recording method for recording information to the optical information recording medium.

FIG. 2 shows a shift multiple recording method in which the optical information recording medium 4 is shifted so that a part of the irradiation regions 7a, 7b, 7c, 7d - - - in the irradiation recording medium 4 overlaps with each other for recording information in order.

Figure 3:
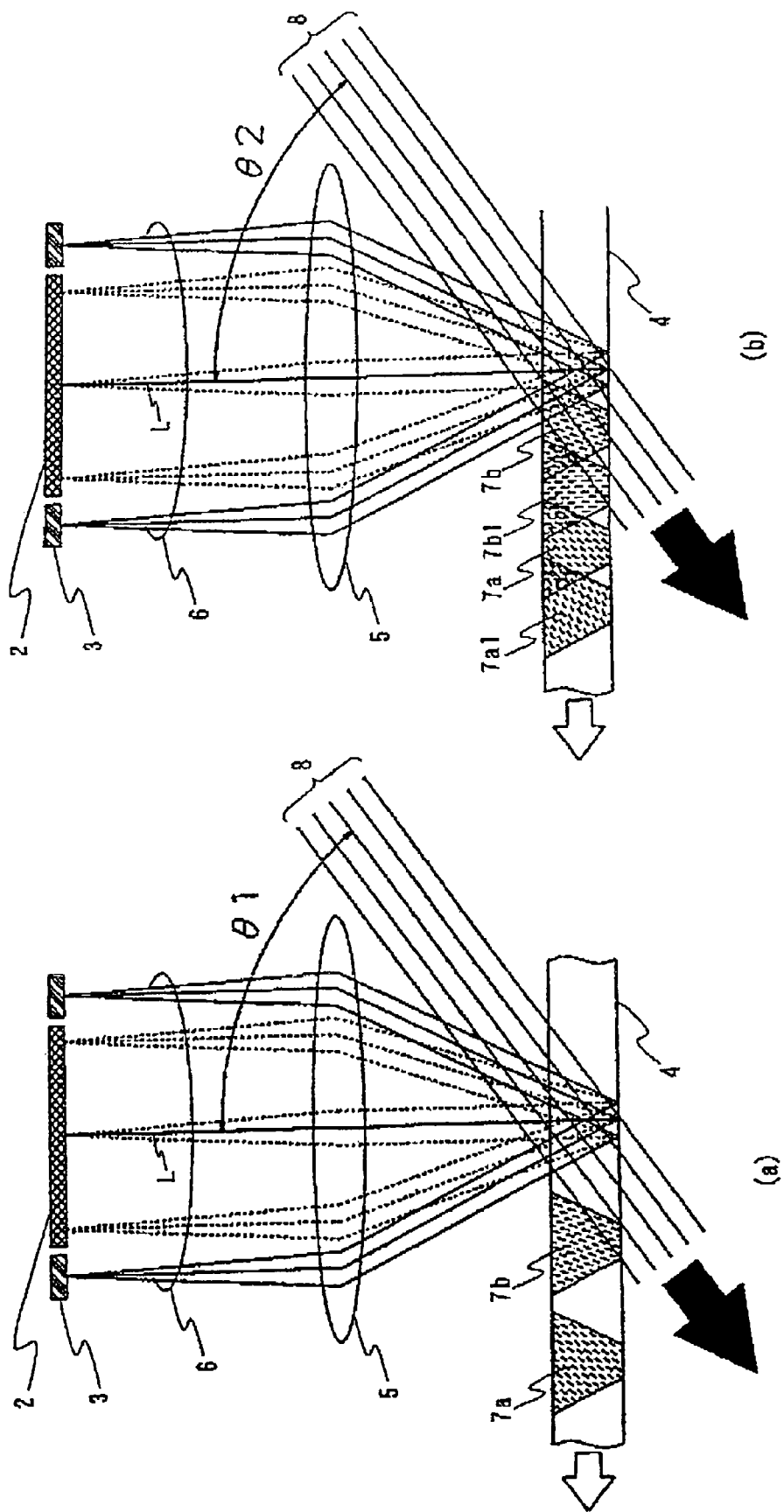
FIGS. 3A and 3B are front elevational view similar to FIG. 2 showing another multiple recording method for recording information to the optical information recording medium.

In FIG. 3, first, as shown in FIG. 3A, the tilt angle with respect to the optical axis L of the virtual recording-specific reference light 8 is set to be θ1 as a first condition for separating the irradiation regions 7a, 7b - - - so as not to overlap the region with each other to perform recording on the entire portion of the optical information recording medium 4. Next, as shown in FIG. 3B, the tilt angle with respect to the optical axis L of the virtual recording-specific reference light 8 is set to be θ2 as a second condition for separating the irradiation regions 7a1, 7b2 - - - so as not to overlap the region with each other, while being partially overlapped with the irradiation regions 7a, 7b - - - of the first condition, to perform recording on the entire portion of the optical information recording medium 4. By performing recording through changing the angle θ in order, multiple recording can be improved and super high density recording becomes possible.

In the case of a surface multiple recording method in which recording and reproduction are performed by a surface unit in the same condition, it is possible to employ the above-described method in which the virtual information light 6 is reproduced at once from a plurality of irradiation regions by the same virtual recording-specific reference light 8. Thus, it is preferable.

By irradiating the virtual reproduction-specific reference light in which the tilt angle with respect to the optical axis L is set to be θ1 onto the optical information recording medium 4 shown in FIG. 3, the virtual information light 6 is reproduced at once from the irradiation regions 7a, 7b - - -. Further, by irradiating the virtual reproduction-specific reference light in which the tilt angle with respect to the optical axis L is set to be θ2, the virtual information light 6 is reproduced at once from the irradiation regions 7a1, 7b1 - - - -. As described, by performing reproduction through changing the angle θ in order, a large quantity of information recorded by the multiple recording method can be easily duplicated.

Figure 4:
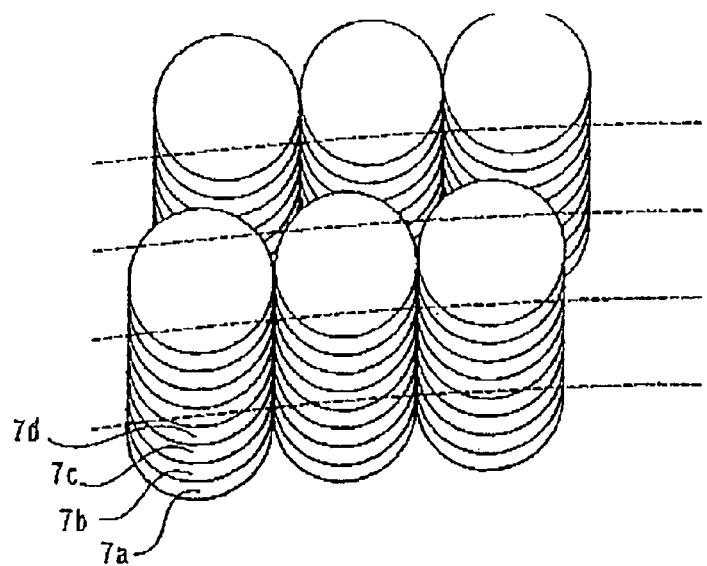
FIG. 4 is a perspective view showing this another multiple recording method for recording information to the optical information recording medium.

As a condition for recording, as shown in FIG. 4, for example, irradiation regions 7b, 7c, 7d - - - with varied recording conditions of the virtual recording-specific reference light 8 may be overlapped in the same position as the irradiation region 7a, and a plurality of interference patterns may be recorded in different irradiation regions by shifting over the irradiation regions through changing the recoding condition of the virtual recording-specific reference light 8.

Figure 5:
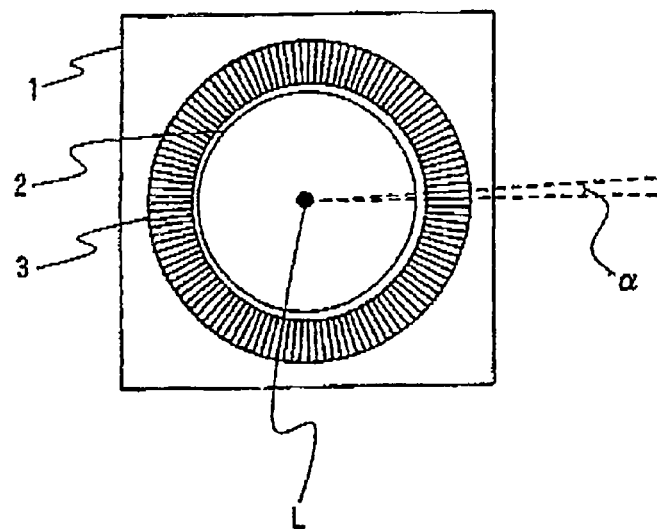
FIG. 5 is an illustration similar to FIG. 1A showing this another multiple recording method for recording information to the optical information recording medium.

Moreover, as a condition for recording, as shown in FIG. 5, assuming that the recording-specific reference light 3 is a set of line segments extending radially from the optical axis L, the center angle α of the incident angle in the circumferential direction with respect to the optical axis L of each line segment of the recording-specific reference light 3 may be changed, for example, by a minimum unit of 0.02° with 3° being a reference angle, for example. That is, the recording condition of the recording-specific reference light 3, in which a hundred and nineteen line segments are arranged by every 3° from one of the line segments of the recording-specific reference light 3 as a reference, is different from the recording condition of the recording-specific reference light 3, in which the position of the line segment as the reference is altered by 0.02° and a hundred and nineteen line segments are arranged by every 3° therefrom.

The optical information recording medium 4 in which the interference pattern is multiple-recorded in the information recording layer using the virtual information light 6 and the virtual recording-specific reference light 8 as described above can be used as a duplication master with high security against duplication, to which super high density information can be recorded.

The optical information recording medium 4 used herein may be selected at will from a circular disc type, a card type in rectangular shape or the like, etc.

The master is an original as the base of duplications produced thereafter. Thus, it is preferable that the interference pattern to be recorded thereon be recorded precisely. For this, minute interference patterns can be recorded precisely by making the master optical information recording medium 4 larger than the slave optical information recording medium, and increasing the size, etc. of the irradiation region in accordance with the ratio of the sizes with respect to the slave. The slave optical information recording medium may be a disc type of 8-cm diameter, for example, which is the size to be compatible with CDs and DVDs. As the master, there may be sued a still larger optical recording medium such as the one with the diameter of 15-30 cm. However, the size of the master may be the same as that of the slave. Since the mother optical information recording medium is used, like the master, for mass-producing the slaves, so that it is preferable to be in the same size as the master. However, it may be in a different size, e.g. the same size as that of the slave.

Furthermore, as the optical system including the objective lens 5 for recording the master, it is preferable to use the one with less aberration and high resolution. As such optical system, it is possible to use the ones using an aspherical lens or a compound lens. Further, it is possible to use a projection lens that is used as a projection aligner of the semiconductor chip to be described later.

Figure 6:
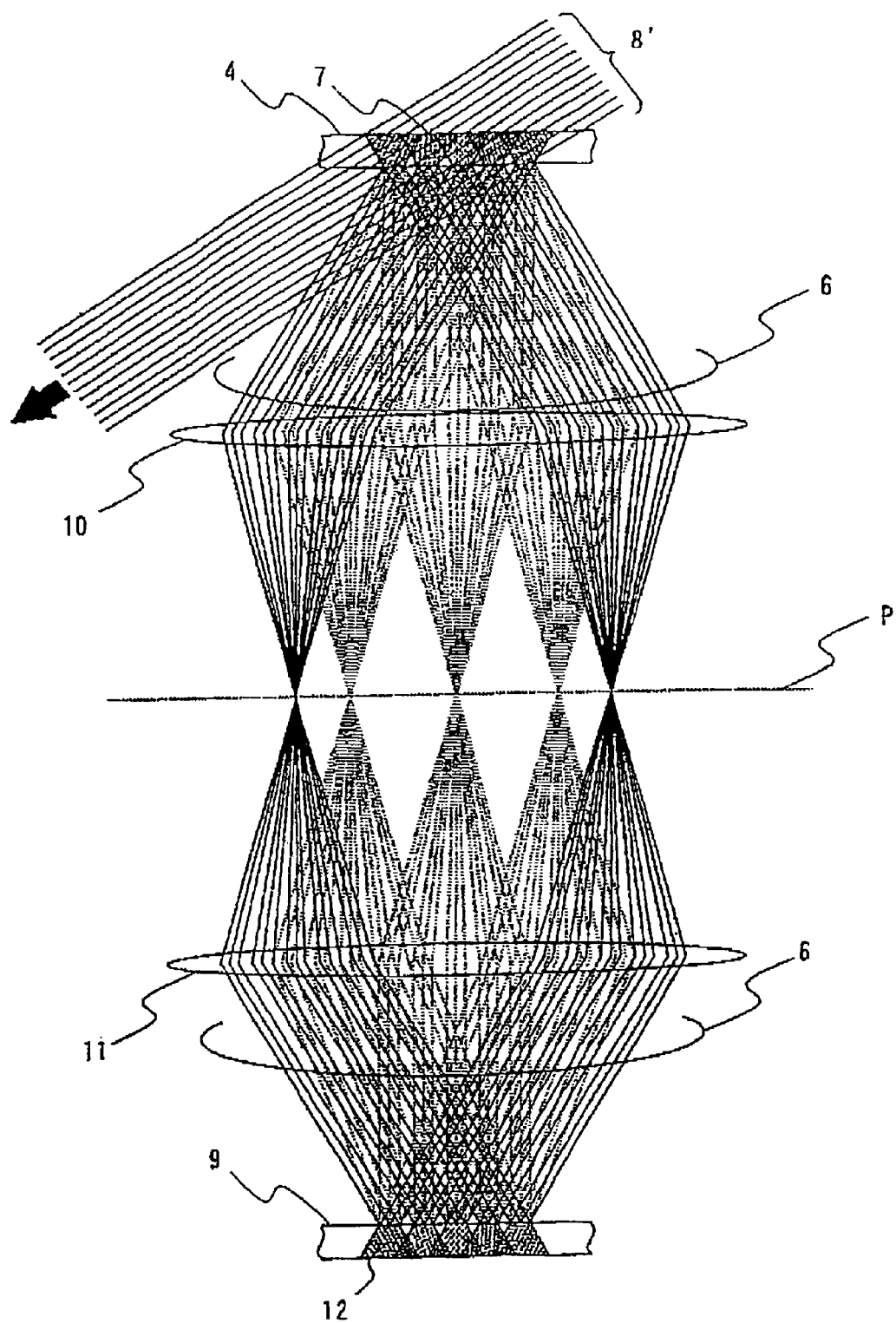
FIG. 6 is a front elevational view showing another embodiment of the optical information recording method and the optical information recording medium of the present invention.

FIG. 6 shows another embodiment of the optical information recording method and the optical information recording medium, and shows a duplication method using the optical recording medium 4 as the master.

In FIG. 6, another optical information recording medium 9 to which information is to be duplicated is disposed by facing the optical information recording medium 4 produced as in FIG. 1 to FIG. 5, to which information has been already recorded. Condenser lenses 10, 11 in which entire information recording regions of both recording media can be enclosed are disposed in between both recording media. Both condenser lenses 10, 11 are so disposed that the center position between the both lenses is the focal position of each lens where image plane P is formed. And the entire portions of the lenses are disposed line symmetrically with respect to the image plane P. The optical information recording medium 9 may be selected from the ones with known configuration. For example, an optical information recording medium comprising, on the rear side of the information recording layer, a layer including prepits which show indication of the track and the like may be used. Further, when using the duplication as the mother, an optical information recording medium with light transmittance may be used.

Next, a duplication method according to the embodiment will be described.

First, the virtual recording-specific reference light irradiated at the time of recording the information is irradiated again under the same condition (the condition such as tilt angle with respect to the optical axis L, wavelength of the light, and the like) as a virtual reproduction-specific reference light 8' onto the optical information recording medium 4 as the master to which information has been already recorded. When the virtual reproduction-specific reference light 8' passes through the optical information recording medium 4, the recorded virtual information light 6 is generated from the interference pattern towards the condenser lens 10 by a unit of the irradiation region 7 by which information recording was performed. The virtual reproduction-specific reference light 8' is tilted with respect to the optical axis L, so that it proceeds towards the outside the system after passing through the optical information recording medium 4 to be prevented from crossing with the virtual information light 6 generated from the optical information recording medium 4.

As shown in FIG. 6, information is recorded in a plurality of irradiation regions 7 by the virtual recording-specific reference light 8 under the same condition so that the virtual information light 6 is reproduced from the entire portion of a plurality of the irradiation regions 7 at once by the virtual reproduction-specific reference light 8'. Thus, the productivity in regards to duplication of information can be greatly increased compared to the conventional case where the information light and the recording-specific reference light are irradiated by each set of information (hologram). Particularly, it is possible to perform recording on the entire surface of another optical information recording medium at once by collectively irradiating the virtual reproduction-specific reference light over the entire surface of the optical information recording medium 4, which may contribute to achieving the productivity that is as good as the plastic injection molding technique for CDs and DVDs.

The virtual information light 6 generated from the entire portion of the optical information recording medium 4 is once converged to the image plane P by the condenser lens 10, and then diffused again to enter the condenser lens 11. Subsequently, while being condensed, it is irradiated to another optical information recording medium 9 and recorded in the information recording layer of the optical recording medium 9 as the interference pattern between the information light 2 and the recording-specific reference light 3 which constitute the virtual information light 6 by a unit of irradiation region 12 which is in the size corresponding to that of the irradiation region 7 of the optical information recording medium 4.

In the case where the optical information recording medium 4 shown in FIG. 6 is the one in which angular multiple method and surface multiple method shown in FIG. 3 as described are combined, further, the virtual reproduction-specific reference light 8' with the second angle θ2 is irradiated for reproducing the virtual information light 6 from a plurality of the irradiation regions 7a1, 7b1 - - - so as to perform recording onto another optical information recording medium 9.

Figure 7:
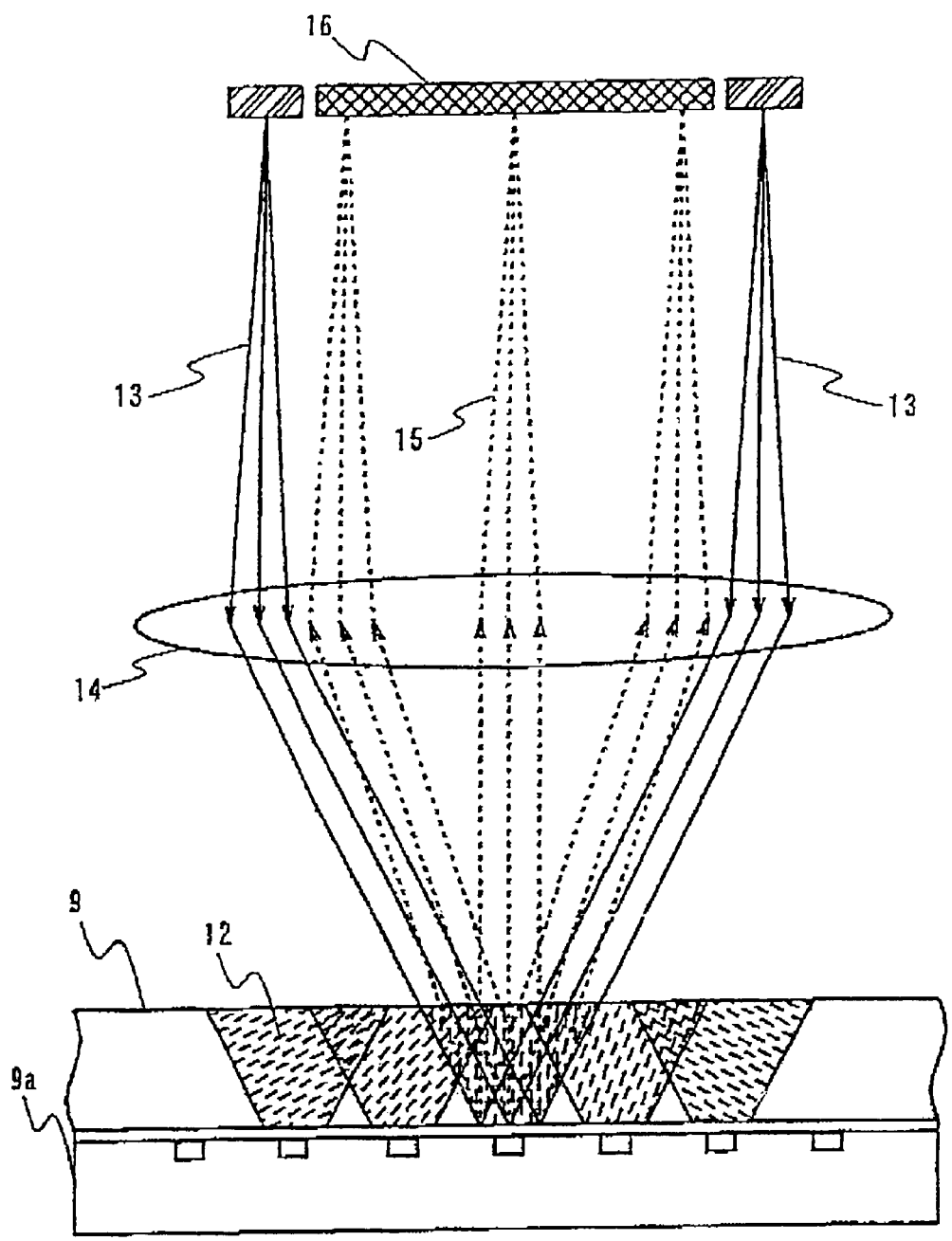
FIG. 7 is a front elevational view showing an information reproducing method of an optical information recording medium which is duplicated by the method of the present invention.

The interference fringe recorded in the irradiation region 12 shown in FIG. 6 is the one obtained by reproducing the information light 2 in still lower side of the another optical information recording medium 9 in FIG. 6 since the optical information recording medium 9 is disposed in the position where the light is once condensed by the condenser lens 11 and dispersed. Therefore, as shown in FIG. 7, when using the optical information recording medium 9 as the slave, the optical information recording medium 9 needs to be turned around and provided with a layer 9a including a reflector layer and prepits for showing indication of the track and the like for reproduction, or another optical information recording medium 9 needs to be used as a transmission type. Thus, it is preferable when duplicating as the slaves to place the optical information recording medium 9 in the position (upper position than the position of the surface of the optical information recording medium 9 in FIG. 6) where the virtual information light is condensed by the condenser lens 11 so that the layer 9a including the reflector layer and the prepits for showing indication of the track and the like can be mounted beforehand.

Thereby, the virtual information light 6 in which the information light 2 and the recording-specific reference light 3 are coaxially disposed can be reproduced and also recorded onto the optical information recording medium 9 from the optical information recording medium 4 as the master which is produced as described above by referring to FIG. 1 to FIG. 5. Thus, the optical information recording medium 9 (slave) to which information is recorded can be easily duplicated by using the recording method in which the information light 2 and the recording-specific reference light 3 are coaxially disposed. At the time of duplication, it is necessary to irradiate the virtual reproduction-specific reference light 8' which is under the same condition as that of the virtual recording-specific reference light 8 used at the time of recording onto the master. Thus, the virtual recording-specific reference light 8 serves as the key for duplication to maintain the confidentiality. Thereby, illegal duplication can be eliminated and high security can be obtained. Further, since the duplicated optical recording medium 9 is produced without irradiating the virtual recoding-specific reference light 8 at a specific angle as described, it is difficult to make duplication again from the duplicated optical information recording medium 9. Accordingly, recorded information of the optical information recording medium to which super high density information is recorded can be very easily and surely duplicated. Further, since it is extremely difficult to make duplication again by using the duplication, this is a renovated method for recording and duplicating information.

Figure 10:
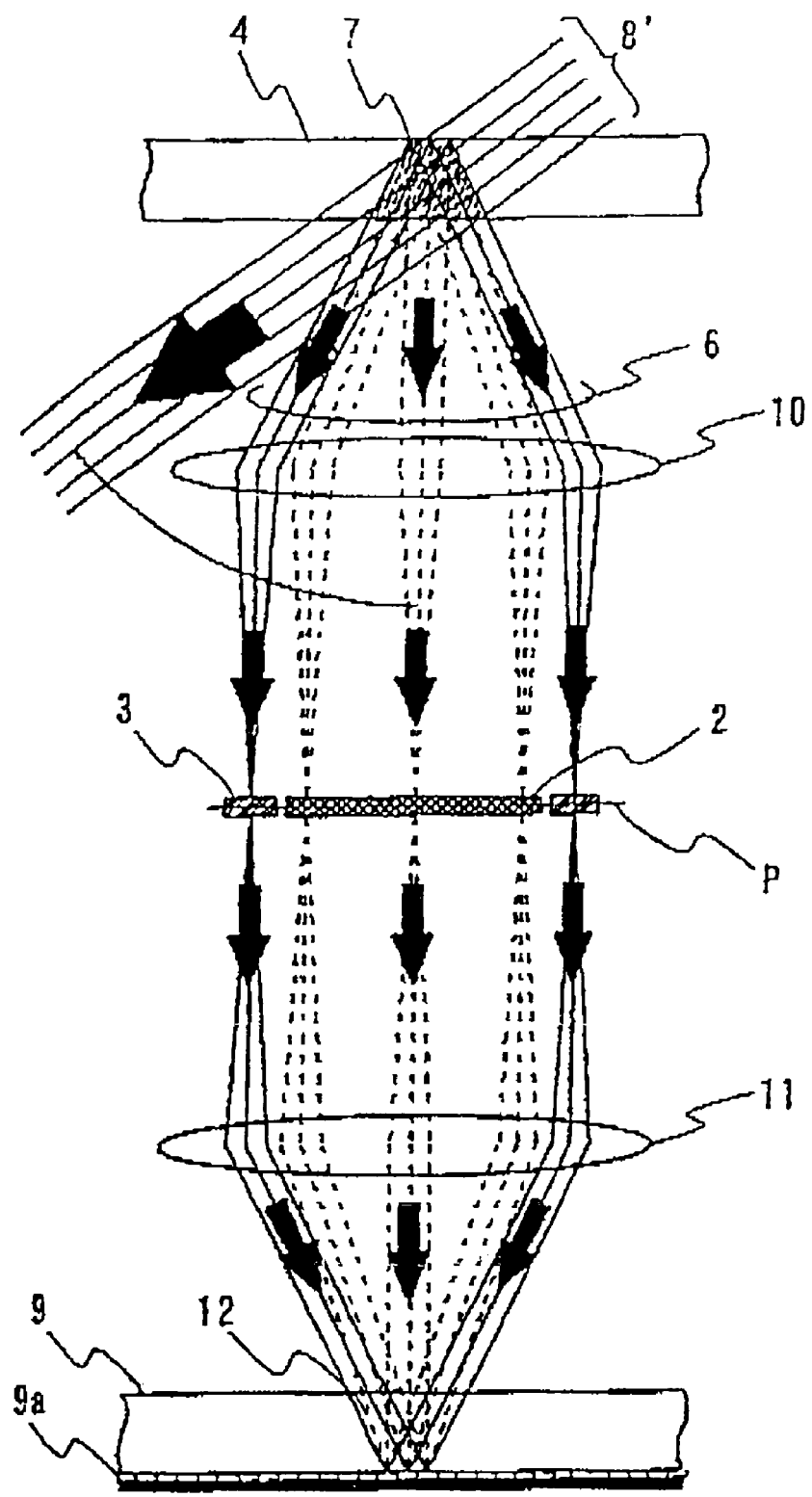
FIG. 10 is a front elevational view showing still another embodiment of the optical information recording method and the optical information recording medium of the present invention.

FIG. 10 shows a modification example of the duplication method using the optical information recording medium 4 as the master. The optical system itself of FIG. 10 is the same one as that of FIG. 6, in which the condenser lenses 10, 11 are disposed in such a manner that the distance from the optical information recording medium 4 to the condenser lens 10=the distance from the condenser lens 10 to the image plane P=the distance from the image plane P to the condenser lens 11=the distance from the condenser lens 10 to the optical information recording medium 9 (slave)=focal length f.

FIG. 10 is distinctive in respect that the virtual reproduction-specific reference light 8' which is phase-conjugate with the virtual recording-specific reference light 8 is irradiated onto the optical information recording medium 4 produced in the manner as shown in FIG. 1 to FIG. 5, to which information has been already recorded. For providing the phase-conjugate virtual reproduction-specific reference light 8', the virtual recording-specific reference light 8 irradiated at the time of recording may be directed in exactly the opposite direction. In FIG. 10, the optical information recording medium 4 is turned around to be disposed and the virtual reproduction-specific reference light 8' is irradiated thereto. Reproduction using the virtual reproduction-specific reference light 8' that is phase-conjugate with the virtual recording-specific reference light 8 is referred to as "phase conjugate reproduction".

In the phase conjugate reproduction, when the virtual information light 6 is reproduced by the virtual reproduction-specific reference light 8' in the opposite direction, the reproduced virtual information light 6 is reproduced through the reverse route from the time of recording. Thus, aberrations due to dents on the surfaces of the optical system and the optical information recording medium 4 formed at the time of recording and differences in the film thickness of the information recording layer and the like can be compensated. It is thus preferable since the aberrations can be further reduced.

Further, in FIG. 10, the information recording layer of the optical information recording medium 9 is disposed in the position where the virtual information light 6 reproduced by the phase conjugate reproduction is condensed by the condenser lens 11, so that the layer 9a including the reflector film and prepits showing indication of the track and the like can be mounted to the optical information recording medium 9 beforehand.

Figure 11:
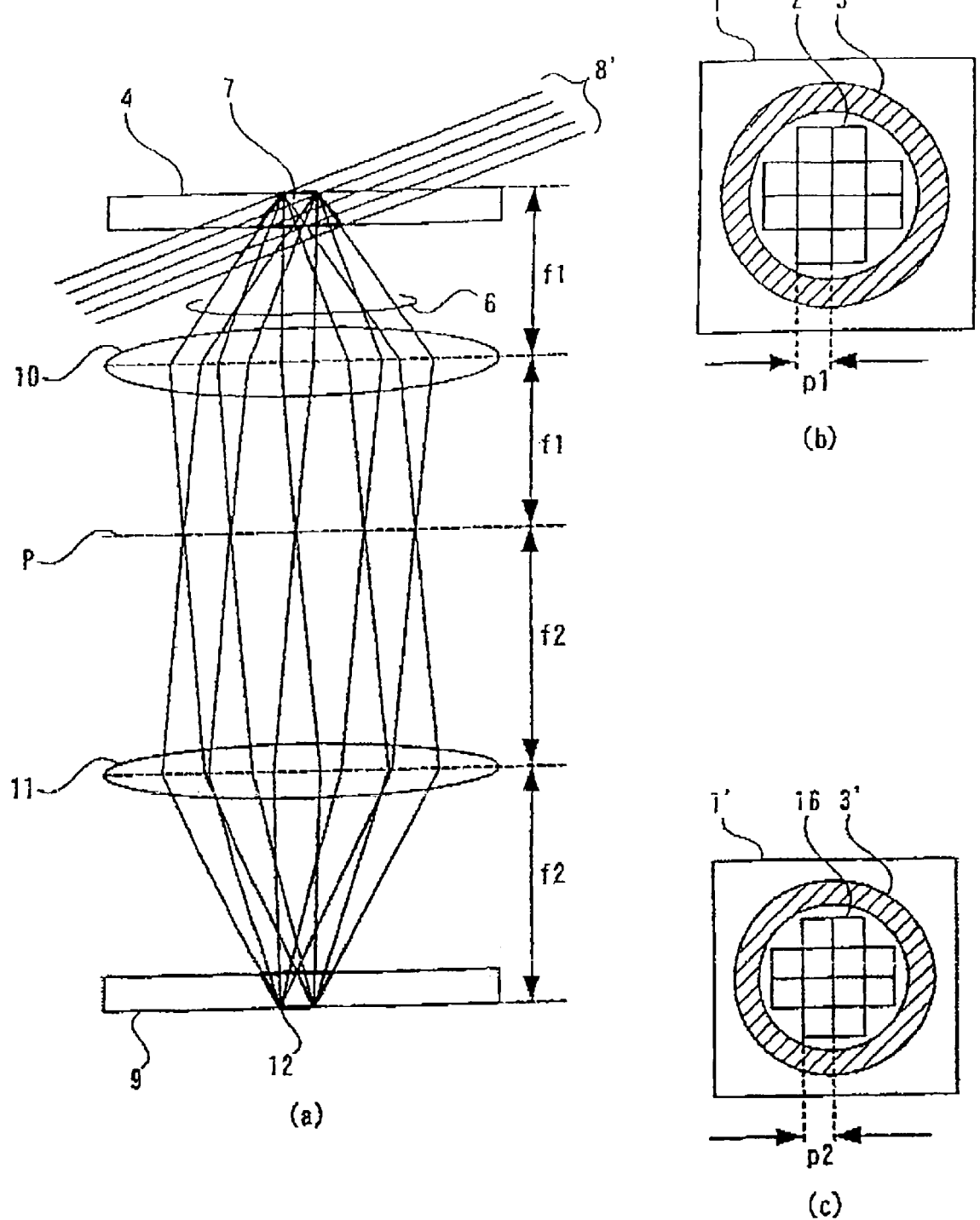
FIG. 11A is a front elevational view showing the optical information recording method and the optical information recording medium of the embodiment.
FIG. 11B is an illustration showing pixel pitch of information light at the time of reproducing the optical information recording medium 4.
FIG. 11C is an illustration showing pixel pitch of information light at the time of reproducing the optical information recording medium 9.

FIG. 11 shows a modification example of the duplication method using the optical information recording medium 4 as the master. The embodiment shown in FIG. 11 provides a method for recording the duplication which can be reproduced by a light source with a wavelength different from that of the light source used at the time of recording and reproducing onto/from the optical information recording medium 4 as the master. FIG. 11A is a schematic view showing the optical system for recording the duplication from the optical recording medium, FIG. 11B is an illustration showing pixel pitch of the information light when the optical information recording medium 4 is reproduced, and FIG. 11C is an illustration showing pixel pitch of the information light when the optical information recording medium 9 is reproduced.

In FIG. 11A, condenser lenses 10, 11 having different focal lengths f1 and f2 are used. The condenser lenses 10, 11 are disposed in such a manner that the distance from the optical information recording medium 4 to the condenser lens 10=the distance from the condenser lens 10 to the image plane P=the first focal length f1, and the distance from the image plane P to the condenser lens 11=the distance from the condenser lens 10 to the optical information recording medium 9=the second focal length f2.

Then, by irradiating the virtual reproduction-specific reference light 8' with the wavelength $\lambda 1$ onto the irradiation region 7, the virtual information light 6 with the wavelength $\lambda 1$ is reproduced from the optical information recording medium 4, and it forms an image in the image plane P by the first condenser lens 10 having the focal length f1. Further, the virtual information light 6 with the wavelength $\lambda 1$ is condensed onto the optical information recording medium 9 by the second condenser lens 11 having the second focal length f2 and the interference pattern between the information light 2 and the recording-specific reference light 3 of the virtual information light 6 is recorded in the irradiation region 12. Since the focal lengths f1 and f2 of the first condenser lens 10 and the second condenser lens 11 are different, the interval of the interference pattern recorded in the irradiation region 12 of the optical information recording medium 9 differs from that of the optical information recording medium 4. As a result, it requires the light source with the wavelength $\lambda 2$, that is, $\lambda 1 \times (f1/f2)$, for reproducing the interference pattern recorded in the optical information recording medium 4. Moreover, the interval of the interference pattern is different so that pixel pitch p2 of a spatial modulator 1' which forms a reproduction-specific reference light 3' for reproducing the information light 2 from the optical information recording medium 9 becomes pixel pitch $p1 \times (\lambda 2/\lambda 1)$. The pixel pitch p1 is the pitch of the spatial modulator 1 for forming the virtual information light 6 for recording information to the optical information recording medium 4.

Therefore, by appropriately setting the focal lengths f1, f2 and the pixel pitches p1, p2 of the condenser lenses 10, 11, the optical information recording medium 9 which can be reproduced by the wavelength λ2 can be duplicated from the optical information recording medium 4 to/from which information is recorded/reproduced by the wavelength λ1. The condition is set to be λ2/λ1=f2/f1=p1/p2.

Further, even with the optical system other than the one shown in FIG. 11, it is possible to record the interference pattern which can be reproduced by the light of the wavelength λ2 that is different from the wavelength λ1 of the light for recording/reproducing to/from the optical information recording medium 4, through changing the magnification of an image reproduced from the optical information recording medium 4 by the virtual reproduction-specific reference light 8' and irradiating it to the another optical information recording medium 9. For example, there may be used a projection lens of a projection aligner that is used for exposing a fine electronic circuit of a semiconductor chip such as IC and LSI.

Furthermore, when the size of the master optical information recording medium 4 is larger than the slave optical information recording medium 9, the ratio of the interference pattern size to be recorded can be decreased by using the above-described optical system. As shown in FIG. 13A, it is possible to produce the slave to which the interference pattern of the information light and the recording-specific reference light in the recording layer of the second optical information recording medium 9 is recorded in the following manner: the virtual reproduction-specific reference light 8' is irradiated collectively over the entire surface of the first optical information recording medium 4 to reproduce the virtual information light 6 from the interference pattern recorded in the irradiation regions 7 on the entire surface of the first optical information recording medium 4; and the virtual optical information light 6 is irradiated onto the entire surface of the second optical information recording medium 9 so as to be reduced in size by a prescribed ratio through a projection lens 20 in which three lenses, from a larger one to smaller ones, are disposed from the optical information recording medium 8 side. The projection lens 20 corresponds to the structure which is a combination of the condenser lenses 10 and 11 of FIG. 6, FIG. 10 and FIG. 11.

The projection lens of the projection aligner is provided with high resolution for enabling it to reduce the fine patterns accurately for exposure, which has less influence by aberration and the like. Thus, it is preferable for producing small slaves from the large master.

As described above, the slave and mother duplicated from the master that is produced by the virtual information light and virtual recording-specific reference light with the wavelength λ1 can be reproduced by the different wavelength λ2. With this technique, for example, it is possible to produce the slave that can be reproduced by blue laser with wavelength of 405 nm from the master and mother which are produced by using green laser with wavelength of 532 nm.

As described above, when the optical information recording medium 4 is used as the master, it is preferable to irradiate the virtual reproduction-specific reference light 8' onto a plurality of irradiation regions 7, more preferably over the entire surface (see FIG. 13) for achieving collective reproduction. It is probable that the light source of the virtual reproduction-specific reference light 8' that can be irradiated onto such a large area may be limited. For example, under the current condition, the laser with the wavelength of 532 nm can be irradiated to a large area. However, a semiconductor laser is also large-scaled so that the device for reproducing the slave as the duplication also becomes large-scaled. Furthermore, under the current condition, a semiconductor laser with the wavelength of 405 nm is small-sized, but the output is small so that the a large area cannot be irradiated (if capable of irradiating the large area, it can be used as the light source of the virtual reproduction-specific reference light for irradiating the entire surface of the optical information recording medium). In holographic recording/reproducing, the hologram recorded by the light source with the wavelength of 532 nm cannot be reproduced by the light source with the wavelength of 405 nm in that state since the wavefronts are different.

In this case, λ2/λ=532 nm/405 nm=1.3. Thus, for example, in FIG. 11A, by using the condenser lens 11 having the focal length f2=1.3 for the condenser lens 10 having the focal length f1=1 and recording the virtual information light 6 in the optical information recording medium 4 by the light source of the wavelength λ1=532 nm using the spatial modulator with the pixel pitch p1=1.3, it is possible to duplicate the optical information recording medium 9 which can be reproduced by the light source of wavelength λ2=405 nm. At this time, for reproducing the optical information recording medium 9, the spatial modulator 1' with the pixel pitch p2=1 is used.

Further, in the duplication method as shown in FIG. 6, FIG. 10 and FIG. 11, by duplicating the optical information recording medium 9 using an optical information recording medium having light transmittance as the optical information recording medium 9 and also irradiating a second virtual recording-specific reference light (may be different from the virtual recording-specific reference light 8 to be irradiated onto the master portion) 18 onto the optical information recording medium 9, the duplication obtained thereby can be used as a mother. In the duplication method as shown in FIG. 11, the second virtual recording-specific reference light 18 is irradiated by the light source with the wavelength λ2.

Figure 12:
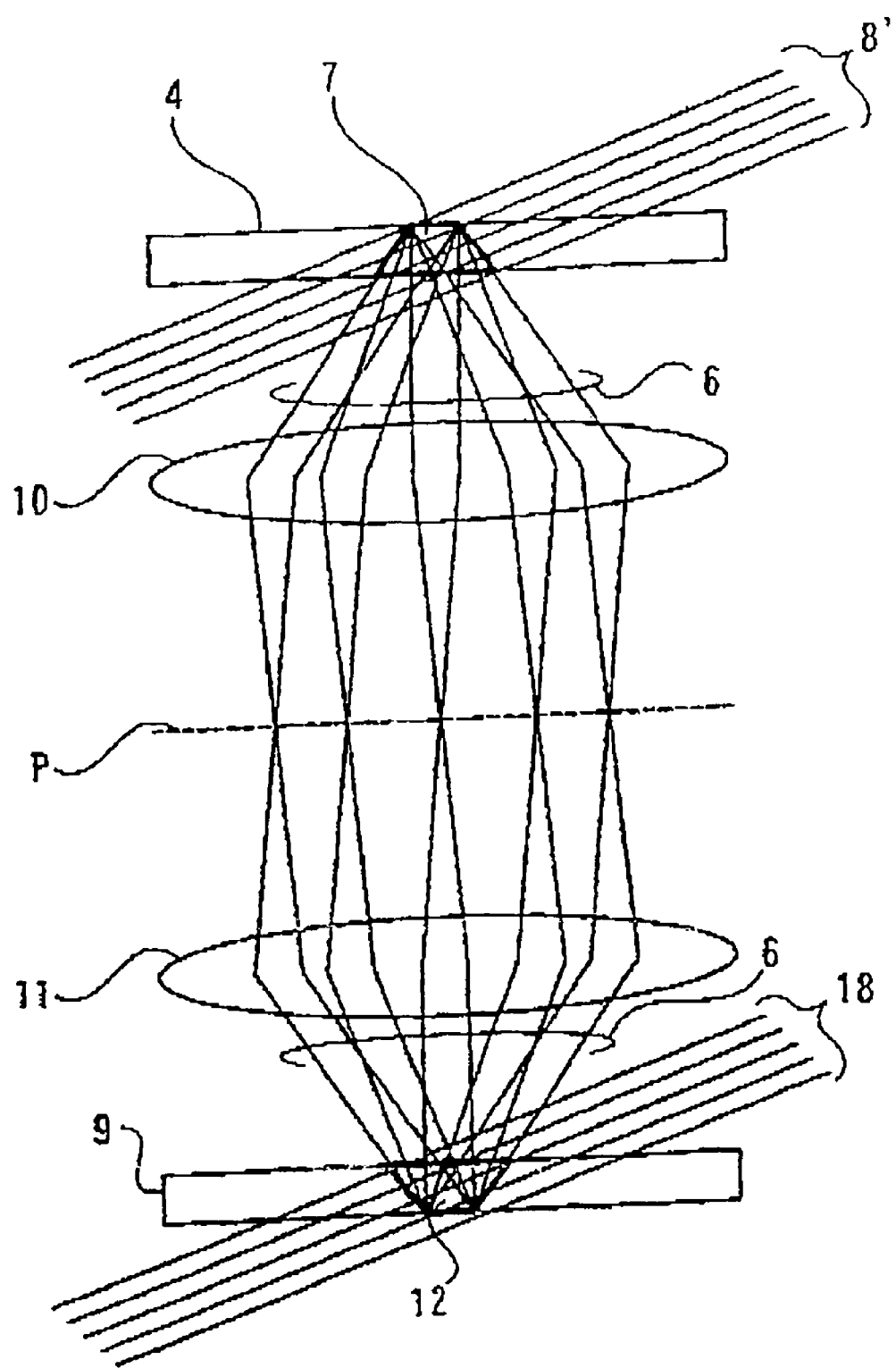
FIG. 12 is a front view showing the embodiment of the optical information recording method and the optical information recording medium of the present invention.
Figure 13:
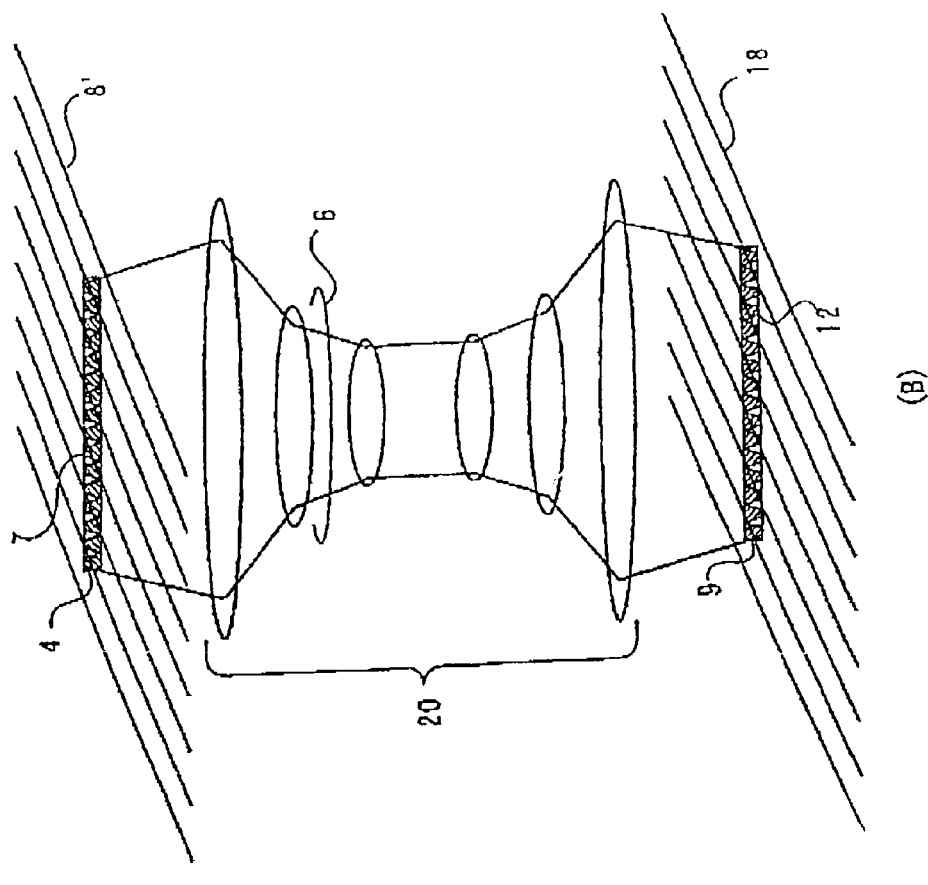
FIGS. 13A and 13B are front elevational views showing yet another embodiment of the optical information recording method and the optical information recording medium of the present invention.
Figure 13:
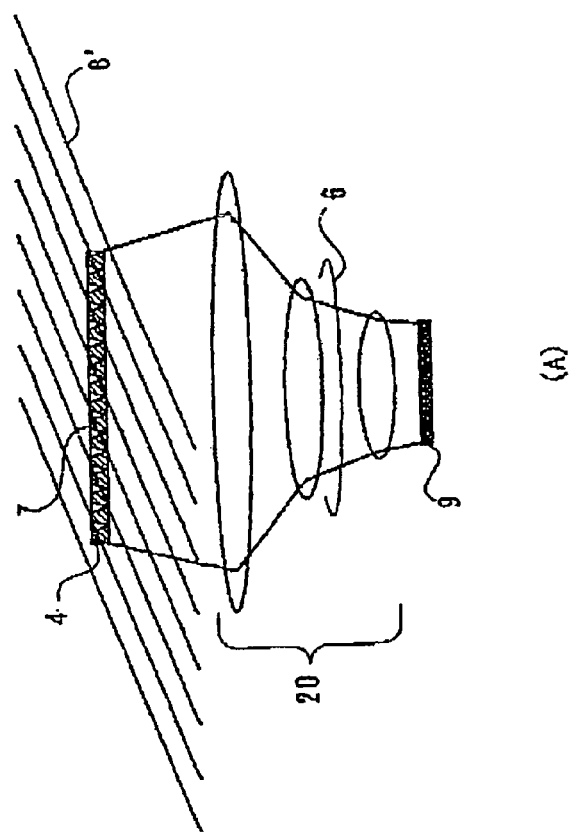

As shown in FIG. 12, the virtual reproduction-specific reference light 8' under the same condition as that of the first virtual recording-specific reference light used for recording is irradiated onto the irradiation region 7 of the optical information recording medium 4. The virtual information light 6 generated thereby from the irradiation region 7 is irradiated onto the second optical information recording medium 9 through the condenser lenses 10, 11 and the second virtual recording-specific reference light 18 is irradiated onto the irradiation region 12 of the optical information recording medium 9 so as to record the interference pattern between the virtual information light 6 and the second recording-specific reference light 18 in the irradiation region 12 of the information recording layer of the optical information recording medium 9.

In FIG. 12, the virtual information light 6 is reproduced from one of the irradiation regions 7 of the first optical information recording medium 4 for duplicating it in one of the irradiation regions 12 of the second optical information recording medium 9. However, it is preferable to collectively duplicate a plurality of regions by: collectively irradiating the virtual reproduction-specific reference light 8' onto a plurality of irradiation regions of the first optical information recording medium 4 for reproducing the virtual information light 6 from a plurality of the irradiation regions; irradiating the virtual information light 6 onto a plurality of regions of the second optical information recording medium 9; and collectively irradiating the second virtual recording-specific reference light 18 onto a plurality of regions of the second optical information recording medium 9.

Further, as shown in FIG. 13B, it is preferable to produce the mothers collectively in a plurality of regions in the following manner: the virtual reproduction-specific reference light 8' is irradiated collectively over the entire surface of the first optical information recording medium 4 to reproduce the virtual information light 6 from the interference pattern recorded in the irradiation regions 7 on the entire surface of the first optical information recording medium 4; and the virtual optical information light 6 is irradiated onto the entire surface of the second optical information recording medium 9 by a projection lens 21, and the second virtual recording-specific reference light 18 is irradiated collectively onto the entire surface of the second optical information recording medium 9.

If the mother is disposed in the position of the optical information recording medium 4 in FIG. 6 and the like, and the same virtual reproduction-specific reference light as that of the second virtual recording-specific reference light which is irradiated at the time of duplicating the mother is irradiated, when the virtual reproduction-specific reference light passes therethrough, the virtual information light recorded by the interference pattern is generated towards the condenser lens 10 by a unit of the irradiation regions 12 by which information is recorded in the information recording layer. Thereby, the slave and the mother can be further produced. Particularly, it is possible to duplicate the slaves of CD-size and DVD-size through performing collective exposure by irradiating the virtual reproduction-specific reference light over the entire surface of the mother.

When the mother is duplicated from the master, the number of master disc for producing the slaves can be increased. Thus, it is effective for mass production. For the master, it is necessary to create the interference patterns by irradiating the virtual information light 6 and the virtual recording-specific reference light 8 each time onto each of the irradiation regions 7. Therefore, fabrication of the master is a hard work, which requires a vast amount of time and man-hours. On the other hand, as for the mother, the virtual information light 6 recorded by the same virtual recording-specific reference light 8 can be reproduced at once by collectively irradiating the virtual reproduction-specific reference light 8' and, further, recording can be performed at once by collectively irradiating the second virtual recording-specific reference light 18 onto the mother. Thus, duplicating the mother is an extremely easy work.

However, because it is easy to produce still another mother or the slaves from the mother, copy guard of the mother is important. Thus, when a plurality of mothers are produced, it is effective to change the second virtual recording-specific reference light 18 for each mother but not use the second virtual recording-specific reference light 18 in common for the plurality of mothers.

Further, as the condition of the second virtual recording-specific reference light, the wavelength and the irradiation angle are limited to some extent depending on the design of the device and the like. Therefore, those can be analyzed from the mother. However, spatial modulation of the second virtual recording-specific reference light 18 by the spatial optical modulator allows the second virtual recording-specific reference light 18 to have a great number of alternatives. Thus, it is possible to eliminate the illegal duplication, thereby improving the security.

With this, even if the second optical information recording medium as the mother comes in a hand of a person unlawfully, it is not possible to produce duplication without knowing the condition of the second virtual recording-specific reference light 18, particularly the spatial modulation pattern.

When producing the mother or the slave from the master or the mother, the amount of information recorded in the master or the mother is enormous and it is necessary to transmit the virtual information light generated by the virtual reproducing-specific reference light 8' as accurate as possible. Therefore, as the condenser lenses 10, 11 and the projection lens 20, it is preferable to use the optical system with high resolution and less aberration. For example, it is possible to use the projection lens of a projection aligner that is used for exposing a fine electronic circuit of a semiconductor chip such as IC and LSI. The projection lens used for the optical system of the projection aligner is designed to have high resolution and to be unsusceptible to the influence of aberration and the like.

In FIG. 13A, three lenses are disposed as the projection lens 20 from the larger one to smaller ones from the optical information recording medium 8 side, and it is designed to have high resolution to be able to expose the interference pattern accurately and to be unsusceptible to the influence of aberration and the like. Furthermore, in FIG. 13B, it is so structured that the mother of the same magnification can be produced by disposing three lenses as the projection lens 20 from the larger one to smaller ones from the optical information recording medium 8 side, and disposing the same three lens from the smaller one to the larger ones. The slave of the same magnification can be also produced by utilizing the projection lens 20 of FIG. 13B, if the second virtual recording-specific reference light 18 is not irradiated.

FIG. 7 shows an information reproducing method of the optical information recording medium 9 which is duplicated by the method shown in FIG. 6. In the optical information recording medium 9 duplicated by the method shown in FIG. 6, information is recorded in completely the same manner as the optical information recording medium to which information is recorded utilizing the conventional recording method where the information light 2 and the recording-specific reference light 3 are coaxially disposed. Accordingly, as shown in FIG. 7, by irradiating same reproduction-specific reference light 13 as the recording-specific reference light 3 used as a part of the virtual information light 6 onto the duplicated optical information recording medium 9 through an objective lens 14, the optical information recording medium 9 emits the recorded information as reproduced information 15 which, then, enters an image-receiving element 16 such as CMOS or the like through the objective lens 14, then is decoded to be taken out as information. On the rear side of the information recording layer of the optical information recording medium 9, the layer 9a including the prepits showing indication of the track and the like is mounted.

The present invention is not limited to the above-described embodiments but various modifications are possible as necessary.

The invention claimed is:

1. An optical information recording method for recording information recorded in a first optical information recording medium onto a second optical information recording medium, said information of said first optical recording medium being recorded by interference pattern generated between virtual information light and virtual recording-specific reference light in irradiation regions by irradiating said virtual information light composed of information light to which information is added by performing spatial modulation and of a recording-specific reference light, and said virtual recording-specific reference light onto said first optical information recording medium having an information recording layer to which information is recorded using holography, comprising the steps of:

irradiating virtual reproduction-specific reference light under same condition as that of said virtual recording-specific reference light onto said first optical recording medium;

irradiating said virtual information light generated from said information recording layer by irradiation of said virtual reproduction-specific reference light onto said second optical information recording medium; and recording interference pattern generated between information light and the recording-specific reference light of said virtual information light in an information recording layer of said second optical information recording medium; and wherein said virtual information light generated from said information recording layer of said first optical information recording medium is irradiated onto said second optical information recording medium with a first lens having a first focal length and a second lens having a second focal length being interposed therebetween.

2. The optical information recording method according to claim 1, wherein said virtual reproduction-specific reference light is irradiated onto a plurality of said irradiation regions of said information recording layer of said first optical information recording medium and a plurality of sets of said virtual information light are reproduced from said plurality of irradiation regions at once.

3. The optical information recording method according to claim 2, wherein said virtual reproduction-specific reference light is irradiated onto entire surface of said information recording layer of said first optical information recording medium.

4. The optical information recording method according to any one of claims 1 to 3, wherein said virtual reproduction-specific reference light is phase-conjugate with said virtual recording-specific reference light.

5. The optical information recording method according to any one of claims 1 to 3, wherein said virtual reproduction-specific reference light is irradiated onto said first optical information recording medium in the direction opposite from that of said virtual recording-specific reference light.

6. The optical information recording method according to claim 1, wherein said interference pattern that is generated between said information light of said virtual information light recorded in said information recording layer of said second optical information recording medium and virtual recording-specific reference light is reproduced by light with wavelength that is different from wavelength of said virtual reproduction-specific reference light.

7. The optical information recording method according to claim 1, wherein said first optical, information recording medium is larger than said second optical information recording medium.

\* \* \* \* \*